US009522668B2

(12) United States Patent
Oosawa et al.

(10) Patent No.: US 9,522,668 B2
(45) Date of Patent: Dec. 20, 2016

(54) BRAKE APPARATUS

(71) Applicant: HITACHI AUTOMOTIVE SYSTEMS, LTD., Hitachinaka-shi, Ibaraki (JP)

(72) Inventors: Toshiya Oosawa, Yokohama (JP); Hiroki Sonoda, Atsugi (JP); Asahi Watanabe, Kawasaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/767,110

(22) PCT Filed: Feb. 10, 2014

(86) PCT No.: PCT/JP2014/053074
§ 371 (c)(1),
(2) Date: Aug. 11, 2015

(87) PCT Pub. No.: WO2014/126054
PCT Pub. Date: Aug. 21, 2014

(65) Prior Publication Data
US 2015/0367828 A1    Dec. 24, 2015

(30) Foreign Application Priority Data

Feb. 12, 2013  (JP) ................ 2013-024138

(51) Int. Cl.
*B60T 17/22*  (2006.01)
*B60T 8/40*  (2006.01)
*B60T 7/04*  (2006.01)
*B60T 13/14*  (2006.01)

(52) U.S. Cl.
CPC .............. *B60T 17/221* (2013.01); *B60T 7/042* (2013.01); *B60T 8/4081* (2013.01); *B60T 13/146* (2013.01)

(58) Field of Classification Search
CPC ............................. B60T 17/221; B60T 17/226
USPC ..................... 303/122.1, 122.08, 122.09
See application file for complete search history.

(56) References Cited

U.S. PATENT DOCUMENTS

| 4,484,784 A | * | 11/1984 | Leiber | ..................... B60T 8/885 303/116.1 |
| 4,750,126 A | * | 6/1988 | Bleckmann | ............. B60T 8/885 318/383 |
| 4,824,182 A | * | 4/1989 | Steffes | .................. B60T 8/4004 303/114.1 |

(Continued)

FOREIGN PATENT DOCUMENTS

| DE | 102012020010 A1 | * 4/2014 | ................ B60T 8/90 |
| JP | 2000-168536 A | 6/2000 | |

(Continued)

*Primary Examiner* — Thomas J Williams
(74) *Attorney, Agent, or Firm* — Foley & Lardner LLP

(57) ABSTRACT

There is provided a brake apparatus configured to identify a fluid leak spot while generating a braking force. The brake apparatus is configured to drive pump 7 to supply a brake fluid to a first fluid passage (fluid passage 11P, discharge passage 13P) and a second fluid passage (fluid passage 11S, discharge passage 13S), switch communicating valves 23P and 23S alternately between open and closed positions more than once, and detect a brake-fluid leakage in the first or second fluid passage on the basis of magnitudes of detection values detected by hydraulic-pressure sensors 92P and 92S during the open-close switching.

18 Claims, 11 Drawing Sheets

(56) References Cited

U.S. PATENT DOCUMENTS

| | | | | |
|---|---|---|---|---|
| 5,039,175 | A * | 8/1991 | Holzmann | B60T 8/4225 303/115.4 |
| 6,123,397 | A * | 9/2000 | Ohtomo | B60T 8/4072 303/116.1 |
| 6,206,489 | B1 * | 3/2001 | Schmidt | B60T 8/4086 303/11 |
| 6,398,318 | B1 * | 6/2002 | Braun | B60T 8/4881 303/122.03 |
| 7,540,572 | B2 * | 6/2009 | Nakamura | B60T 8/36 303/119.2 |
| 2008/0234909 | A1 | 9/2008 | Iwasaki et al. | |
| 2015/0175144 | A1 * | 6/2015 | Watanabe | B60T 8/4081 303/10 |

FOREIGN PATENT DOCUMENTS

| | | |
|---|---|---|
| JP | 2001-206209 A | 7/2001 |
| JP | 2008-230355 A | 10/2008 |
| JP | 2012-116293 A | 6/2012 |

* cited by examiner

BRAKE APPARATUS

TECHNICAL FIELD

The present invention relates to a brake apparatus.

BACKGROUND ART

According to conventional brake apparatuses, sensors for detecting the wheel-cylinder hydraulic pressures are provided to vehicle wheels to detect a defect from detection values of the sensors, and after the defect detection, a braking force is secured in the wheels other than a defective wheel. One example related to the foregoing technology is described in Patent Document 1.

CITATION LIST

Patent Document

Patent document 1: Japanese Unexamined Patent Application Publication No. 2000-168536

SUMMARY OF INVENTION

Technical Problem

Regarding the conventional device mentioned above, there has been a request to identify a leak spot in case of brake fluid leakage while a braking force is being generated.

It is an object of the invention to provide a brake apparatus that is capable of identifying a leak spot while generating a braking force.

Solution to Problem

A brake apparatus of the invention is configured to supply a brake fluid to a first fluid passage fluidically connecting a hydraulic-pressure source to a first wheel cylinder that is at least one of wheel cylinders, and a second fluid passage fluidically connecting the hydraulic-pressure source to a second wheel cylinder that is another of the wheel cylinders, switch first and second control valves alternately between open and closed positions more than once, and detect a brake-fluid leakage in the first or second fluid passage on the basis of magnitudes of hydraulic pressures of the first and second wheel cylinders during the open-close switching of the first and second control valves.

The hydraulic pressures of the first and second wheel cylinders are detected, for example, by first and second hydraulic-pressure sensors respectively.

DESCRIPTION OF EMBODIMENTS

Embodiments of a brake apparatus according to the present invention will be described below with reference to the embodiments shown in the attached drawings.

The embodiments described below have been considered to meet a multitude of needs. What is addressed by the embodiments is one of the needs considered. The following embodiments further address the need for securing a sufficient braking force during a brake operation.

Embodiment 1

The configuration of an Embodiment 1 will be described below.

Figure 1:
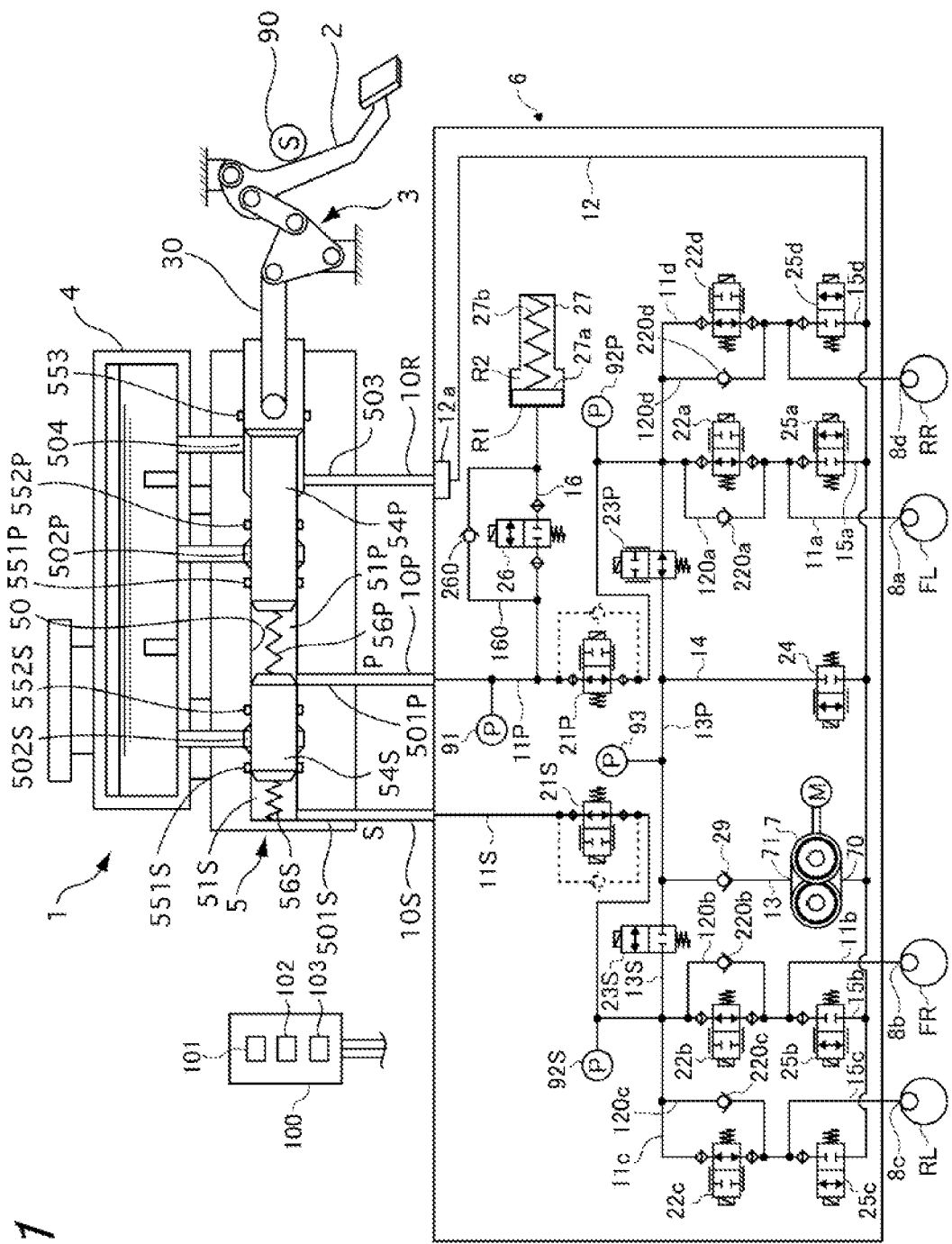
FIG. 1 shows a schematic configuration of a brake apparatus of an Embodiment 1 together with a hydraulic circuit of a hydraulic pressure unit.

FIG. 1 shows a schematic configuration of a brake apparatus 1 of an Embodiment 1 together with a hydraulic circuit of a hydraulic pressure unit 6. A master cylinder 5 is shown in axial section (partial cross-section along a plane containing an axis). The brake apparatus 1 is a hydraulic brake apparatus that is applied to a brake system for electric vehicles, such as hybrid automobiles whose wheel-driving motor includes not only an engine but an electric motor (generator), and electric automobiles whose wheel-driving motor includes an electric motor (generator) only. In these electric vehicles, regenerative braking for braking the vehicle can be performed by regenerating a vehicle's kinetic energy into electric energy by means of a regenerative brake apparatus with a motor (generator). The brake apparatus 1 supplies a brake fluid serving as a working fluid to a brake actuating unit mounted on each of wheels FL, RL, FR, and RR to generate a brake fluid pressure (wheel-cylinder hydraulic pressure), and thus provides a hydraulic braking force to the wheels FL, RL, FR, and RR.

The brake actuating unit including wheel cylinders 8 is of a so-called disc type at least with respect to the front wheels FL and FR. The brake actuating unit has a brake disc serving as a brake rotor that rotates integrally with a tire, and a caliper (hydraulic brake caliper) including brake pads that are placed leaving a predetermined clearance (gap or play) to the brake disc and generates a braking force by being moved by the wheel-cylinder hydraulic pressure to come into contact with the brake disc. With respect to the rear wheels RL and RR, for example, a brake actuating unit of a so-called drum type may be utilized. The brake apparatus 1 has dual-system (primary P-system and secondary S-system) brake piping, and employs X-piping, for example. The brake apparatus 1 may employ another piping such as front/rear piping. Hereinafter, elements corresponding to the P-system and those corresponding to the S-system are discriminated from each other, if necessary, by being provided with letters P and S, respectively, at the end of their reference marks. Elements corresponding to the wheels FL, RL, FR, and RR are provided with letters a, b, c, and d, respectively, at the end of reference marks thereof for discrimination, as needed.

The brake apparatus 1 includes a brake pedal 2 serving as a braking member that receives input of a brake operation by a driver; a link mechanism 3 that makes variable a change ratio of a brake operation force (depressing force on the brake pedal 2) to an amount of operation of the brake pedal 2 (pedal stroke) by the driver; a reservoir tank (hereinafter, referred to as reservoir) 4 that is a brake fluid source storing a brake fluid and is a low-pressure part released into atmospheric pressure; a master cylinder 5 that is connected to the brake pedal 2 through the link mechanism 3, supplied with the brake fluid from the reservoir 4, activated by the driver operating the brake pedal 2 (brake operation) to generate a brake fluid pressure (master-cylinder hydraulic pressure); a hydraulic pressure unit 6 that is supplied with the brake fluid from the reservoir 4 or the master cylinder 5, and generates a brake fluid pressure independently of the brake operation by the driver; and an electronic control unit (hereinafter, referred to as ECU) 100 that controls the operation of the hydraulic pressure unit 6. The brake pedal 2 is provided with a pedal stroke sensor 90 that detects pedal strokes.

The brake apparatus 1 does not include a negative-pressure booster (hereinafter, referred to as engine negative-pressure booster) that uses a suction negative pressure generated by vehicle engine to boost or amplify the brake operation force (pedal depressing force). The link mechanism 3 is a mechanism for amplifying a pedal depressing force, which is placed between the brake pedal 2 and the master cylinder 5. An input-side link member of the link mechanism 3 is turnably connected to the brake pedal 2 while an output-side link member is turnably connected to a pushrod 30. The master cylinder 5 is of a tandem type. The master cylinder 5 includes a primary piston 54P connected to the pushrod 30 and a free piston-type secondary piston 54S as master cylinder pistons that move in an axial direction according to the brake operation by the driver.

The hydraulic pressure unit 6 is placed between the wheel cylinders 8 and the master cylinder 5. The hydraulic pressure unit 6 is capable of supplying a master-cylinder hydraulic pressure or a control hydraulic pressure to each of the wheel cylinders 8 individually. The hydraulic pressure unit 6 has a pump 7 and a plurality of control valves (electromagnetic valves 21 and the like) as a hydraulic device (actuator) for generating the control hydraulic pressure. The pump 7 is rotated by a motor M to suck in the brake fluid in the reservoir 4 and discharge the brake fluid toward the wheel cylinders 8. As the pump 7, the present embodiment employs a gear pump excellent in noise and vibration performance and the like, and more specifically an external gear pump. The pump 7 is commonly used between in both the systems and driven by the single motor M. The motor M may be, for example, a motor with a brush. The electromagnetic valve 21 and the like are opened/closed according to a control signal to control the flow of the brake fluid. The hydraulic pressure unit 6 is provided to be capable of increasing the pressure of the wheel cylinders 8 by using the hydraulic pressure generated by the pump 7 while blocking communication between the master cylinder 5 and the wheel cylinders 8, and comprises a stroke simulator 27 that creates pedal strokes when the brake fluid flows from the master cylinder 5 into the stroke simulator 27 according to the brake operation by the driver. The hydraulic pressure unit 6 includes hydraulic-pressure sensors 91 to 93 that detect a discharge pressure of the pump 7 and the master-cylinder hydraulic pressure.

An ECU 100 is inputted with detection values transmitted from the pedal stroke sensor 90 and the hydraulic-pressure sensors 91 to 93, and information related to a running condition, which is transmitted from a vehicle. On the basis of a built-in program, the ECU 100 controls each actuator of the hydraulic pressure unit 6. To be more specific, the ECU 100 controls the opening/closing operation of the electromagnetic valve 21 and the like for switching a communicating condition of a fluid passage, and the rotating speed of the motor M (namely, the discharge amount of the pump 7) which drives the pump 7. This enables boost control for reducing the brake operation force, antilock brake control (hereinafter, referred to as ABS) for suppressing a wheel slip caused by braking, brake control for controlling a vehicle motion (vehicle behavior stabilization control such as side-slip prevention; hereinafter, referred to as VDC), automatic brake control such as preceding-vehicle follow-up control, regenerative coordination brake control that controls a wheel-cylinder hydraulic pressure to achieve target deceleration (target braking force) in coordination with a regenerative brake, and the like. In the boost control, when the driver operates the brake, the ECU 100 creates a wheel-cylinder hydraulic pressure that is higher than a master-cylinder hydraulic pressure by driving the hydraulic pressure unit 6 (by using the discharge pressure of the pump 7) and thus generates a hydraulic braking force that is insufficient in the driver's brake operation force. By so doing, the ECU 100 exerts a boost function that assists the brake operation. In other words, the ECU 100 is capable of assisting the brake operation force by actuating the hydraulic pressure unit 6 (pump 7) instead of being provided with an engine negative-pressure booster. In the regenerative coordination brake control, for example, in order to generate a braking force required by the driver, the ECU 100 generates a hydraulic braking force that is insufficient in the regenerative braking force of a regenerative braking device. The ECU 100 includes a target wheel-cylinder hydraulic pressure controlling unit 101, a fluid-leakage detecting unit 102, and a pump pressurization checking unit 103, which will be discussed below. The target wheel-cylinder hydraulic pressure controlling unit 101, the fluid-leakage detecting unit 102, and the pump pressurization checking unit 103 are configured by a program stored in the ECU 100.

The master cylinder 5 is a first hydraulic-pressure source that is connected to the wheel cylinders 8 through fluid passages 11 (11P, 11S) mentioned later and is capable of increasing wheel-cylinder hydraulic pressures. The master cylinder 5 is capable of pressurizing the wheel cylinders 8a and 8d through the fluid passage (fluid passage 11P) of a P-system by using a master-cylinder hydraulic pressure generated in a first fluid chamber 51P, and also capable of pressurizing the wheel cylinders 8b and 8c through the fluid passage (fluid passage 11S) of an S-system by using a master-cylinder hydraulic pressure generated in a second fluid chamber 51S. The pistons 54P and 54S of the master cylinder 5 are so inserted as to be movable in an axial direction along an inner periphery of a cylinder 50 in the shape of a bottomed cylinder. The cylinder 50 is provided, in each of P- and S-systems, with discharge ports (supply ports) 501 (501P, 501S) connected to the hydraulic pressure unit 6 to come into communication with the wheel cylinders 8, and refill ports 502 (502P, 502S) connected to the reservoir 4 to come into communication therewith. The cylinder 50 has a suction port 503 connected to the hydraulic pressure unit 6 to come into communication with a sucking section 70 of the pump 7, and a refill port 504 connected to the reservoir 4 to come into communication therewith. In the first fluid chamber 51P located between the pistons 54P and 54S, a coil spring 56P serving as a return spring is housed in a compressed position. In the second fluid chamber 51S located between the piston 54S and an axial end of the cylinder 50, a coil spring 56S is housed in a compressed position. The discharge ports 501P and 501S are normally open in the first and second fluid chambers 51P and 51S. The refill port 504 is normally in communication with the suction port 503.

Placed in the inner periphery of the cylinder 50 are piston seals 55 (551 to 553), namely, a plurality of seal members which come into sliding contact with the pistons 54P and 54S to seal between outer peripheries of the pistons 54P and 54S and the inner periphery of the cylinder 50. Each of the piston seals 55 (not shown in FIG. 1 and the like) is a well-known seal member having a cup-shaped section (cup seal), which includes a lip on an inner-diameter side. When the lip is in sliding contact with the outer periphery of each of the pistons 54, the piston seal allows the brake fluid to flow in one direction and suppress the brake fluid from flowing in the other direction. The first piston seal 551 is situated in such a direction as to allow the brake fluid to flow from the refill port 502 toward the first and second fluid chambers 51P and 51S (discharge port 501) and suppress the brake fluid from flowing in an opposite direction. The second piston seal 552 is situated in such a direction as to suppress the brake fluid from flowing toward the refill port 502 and allow the brake fluid to flow out through the refill port 502. The third piston seal 553 is situated in such a direction as to suppress the brake fluid from flowing out of the cylinder 50 through the refill port 504. The first and second fluid chambers 51P and 51S are decreased in volume when the pistons 54 are stroked in the axial direction away from the brake pedal 2 by the driver depressing the brake pedal 2, thereby generating a hydraulic pressure (master-cylinder hydraulic pressure). The brake fluid is thus supplied from the first and second fluid chambers 51P and 51S through the discharge port 501 toward the wheel cylinders 8. In the P-system and the S-system, substantially the same hydraulic pressure is generated in the first and second fluid chambers 51P and 51S.

A brake fluid pressure circuit of the hydraulic pressure unit 6 will be explained below with reference to FIG. 1. The hydraulic pressure unit 6 includes the fluid passages 11 (11P, 11S) connecting a connecting pipe 10 extending from the discharge port 501 (first fluid chamber 51) of the master cylinder 5 to the wheel cylinders 8; normally-open (open in a power-off state) shutoff valves 21 (21P, 21S) placed in the fluid passages 11; normally-open booster valves 22 (22a to 22d) placed nearer the wheel cylinders 8 in relation to the shutoff valves 21 in the fluid passages 11, corresponding to wheels FL, FR, RL and RR (in their respective fluid passages 11a to 11d); bypass fluid passages 120 (120a to 120d) bypassing the booster valves 22 and arranged in parallel with the fluid passages 11; check valves 220 (220a to 220d) placed in the bypass fluid passages 120 and allowing the brake fluid to flow only from direction of the wheel cylinders 8 toward the master cylinder 5; a suction fluid passage 12 connecting the suction port 503 of the master cylinder 5 to the sucking section 70 of the pump 7; discharge passages (communicating passages) 13 (13P, 13S) connecting a discharging section 71 of the pump 7 to a point between the shutoff valves 21 and the booster valves 22 in the fluid passages 11; check valve (discharge valve of the pump 7) 29 placed in the discharge passage 13 and allowing the brake fluid to flow only from direction of the discharging section 71 toward the fluid passages 11; a normally-open communicating valve 23P placed in the discharge passage (communicating passage) 13P connecting a downstream side of the check valve 29 to the fluid passage 11P of the P-system; a normally-closed (closed in the power-off state) communicating valve 23S placed in the discharge passage (communicating passage) 13S connecting the downstream side of the check valve 29 to the fluid passage 11S of the S-system; a first decompression fluid passage 14 connecting a point located between the check valve 29 and the communicating valve 23P in the discharge passage 13P to the suction fluid passage 12; a normally-closed first decompression valve 24 placed in the first decompression fluid passage 14; second decompression fluid passages 15 (15a to 15d) connecting a portion of the fluid passage 11, which extends from the booster valve 22 toward the wheel cylinders 8, to the suction fluid passage 12; normally-closed second decompression valves 25 (25a to 25b) placed in the second decompression fluid passages 15; a first simulator fluid passage 16 diverging from the fluid passage 11P of the P-system at a point located nearer the master cylinder 5 in relation to the shutoff valve 21P in the fluid passage 11P, the first simulator fluid passage 16 being connected to a main chamber R1 of the stroke simulator 27; a normally-closed simulator shutoff valve 26 placed in the first simulator fluid passage 16; a bypass fluid passage 160 bypassing the simulator shutoff valve 26 and arranged in parallel with the first simulator fluid passage 16; and a check valve 260 placed in the bypass fluid passage 160 and allowing the brake fluid to flow only from direction of the main chamber R1 of the stroke simulator 27 toward the fluid passage 11P. In the hydraulic pressure unit 6, a fluid tank or reservoir 12a is placed in a portion where a connecting pipe 10R extending from the master cylinder 5 (suction port 503) is connected to the suction fluid passage 12 of the hydraulic pressure unit 6 (perpendicularly upper side of the hydraulic pressure unit 6). The discharge passages 13P and 13S form communicating passages connecting the fluid passage 11P of the P-system to the fluid passage 11S of the S-system. As shown by dash lines in FIG. 1, in order for improvement of braking feeling, and the like, bypass fluid passages may be formed so as to bypass the shutoff valves 21 (21P, 21S) and extend in parallel with the fluid passages 11 (11P, 11S), and check valves that allow the brake fluid to flow only from direction of the master cylinder 5 toward the wheel cylinders 8 may be placed in these bypass fluid passages.

The shutoff valves 21 (21P, 21S), the booster valves 22 (22a to 22d), the communicating valve 23P, and the first decompression valve 24 are proportional control valves that are regulated in valve-opening degree in proportion to electric current supplied to solenoids. At least one of the second decompression valves 25 (25a to 25d) of the P- and S-systems (second decompression valves 25a and 25b of the front wheels FL and FR in Embodiment 1) is a proportional control valve. The other valves (the communicating valve 23S, the second decompression valves 25c and 25d of the rear wheels RL and RR, and the simulator shutoff valve 26) are on-off valves subjected to on-off control. The other valves mentioned above may be proportional control valves. Placed between the discharge port 501P of the master cylinder 5 and the shutoff valve 21P in the fluid passage 11P is a hydraulic-pressure sensor 91 that detects hydraulic pressure of this place (mater cylinder hydraulic pressure). Placed between the shutoff valves 21 (21P, 21S) and the booster valves 22 (22a to 22d) in the fluid passages 11 (11P, 11S) are hydraulic-pressure sensors 92 (92P, 92S) that detect hydraulic pressure of this place (wheel-cylinder hydraulic pressure). Placed between the discharging section 71 (check valve 29) of the pump 7 and the communicating valve 23P in the discharge passage 13P is a hydraulic-pressure sensor 93 that detects hydraulic pressure of this place (pump discharge pressure).

The stroke simulator 27 has a piston 27a that is axially movable within a chamber R so as to divide the chamber R into two chambers (main chamber R1 and secondary chamber R2), and a spring 27b that is an elastic member housed in the secondary chamber R2 in a compressed position and normally biasing the piston 27a toward the main chamber R1 (in such a direction as to decrease the volume of the main chamber R1 and increase the volume of the secondary chamber R2). The main chamber R1 is connected through the first simulator fluid passage 16 to the fluid passage 11P of the P-system. When the shutoff valve 21P is closed, the master-cylinder hydraulic pressure acts on the main chamber R1 through the fluid passage 11P and the first simulator fluid passage 16.

When a predetermined or higher hydraulic pressure (master-cylinder hydraulic pressure) acts on a pressure-receiving face of the piston 27a in the main chamber R1, the piston 27a axially moves toward the secondary chamber R2 while compressing the spring 27b, to thereby increase the volume of the main chamber R1. The brake fluid then flows from the master cylinder 5 (discharge port 501P) through the fluid passages (fluid passage 11P and the first simulator fluid passage 16) into the main chamber R1. When the pressure in the main chamber R1 is decreased less than a predetermined value, the piston 27a returns to an initial position due to a biasing force (elastic force) of the spring 27b. Thus, the stroke simulator 27 sucks in or discharges the brake fluid from the master cylinder 5 to create pedal strokes if the driver performs the brake operation (depresses or releases the brake pedal 2) with the shutoff valve 21P closed to block the communication between the master cylinder 5 and the wheel cylinders 8.

The simulator shutoff valve 26 is energized to be opened and thus brings the first simulator fluid passage 16 into communication. The bypass fluid passage 160 and the check valve 260 have a fail-safe function. More specifically, when the brake pedal 2 is depressed with the shutoff valve 21 closed to block the communication between the master cylinder 5 and the wheel cylinders 8, the brake fluid is sucked in from the master cylinder 5 into the stroke simulator 27. At this time, if there is a power supply failure when the brake fluid is discharged from the wheel cylinders 8 through the suction fluid passage 12 into the reservoir 4 by the wheel-cylinder hydraulic pressure being controlled, it is likely that a sufficient braking force fails to be provided. In other words, the normally-closed simulator shutoff valve 26 is closed, which traps the brake fluid in the stroke simulator 27. In the result, there is the possibility that the brake fluid remaining in the master cylinder 5 is insufficient in quantity for boosting the wheel cylinders 8 again. In contrast, according to Embodiment 1, even if the simulator shutoff valve 26 is closed, the brake fluid in the stroke simulator 27 (main chamber R1) can be returned to the fluid passage 11P through the bypass fluid passage 160. The Embodiment 1 therefore solves the foregoing problem.

[Fluid Leakage Detection Control Processing]

Figure 2:
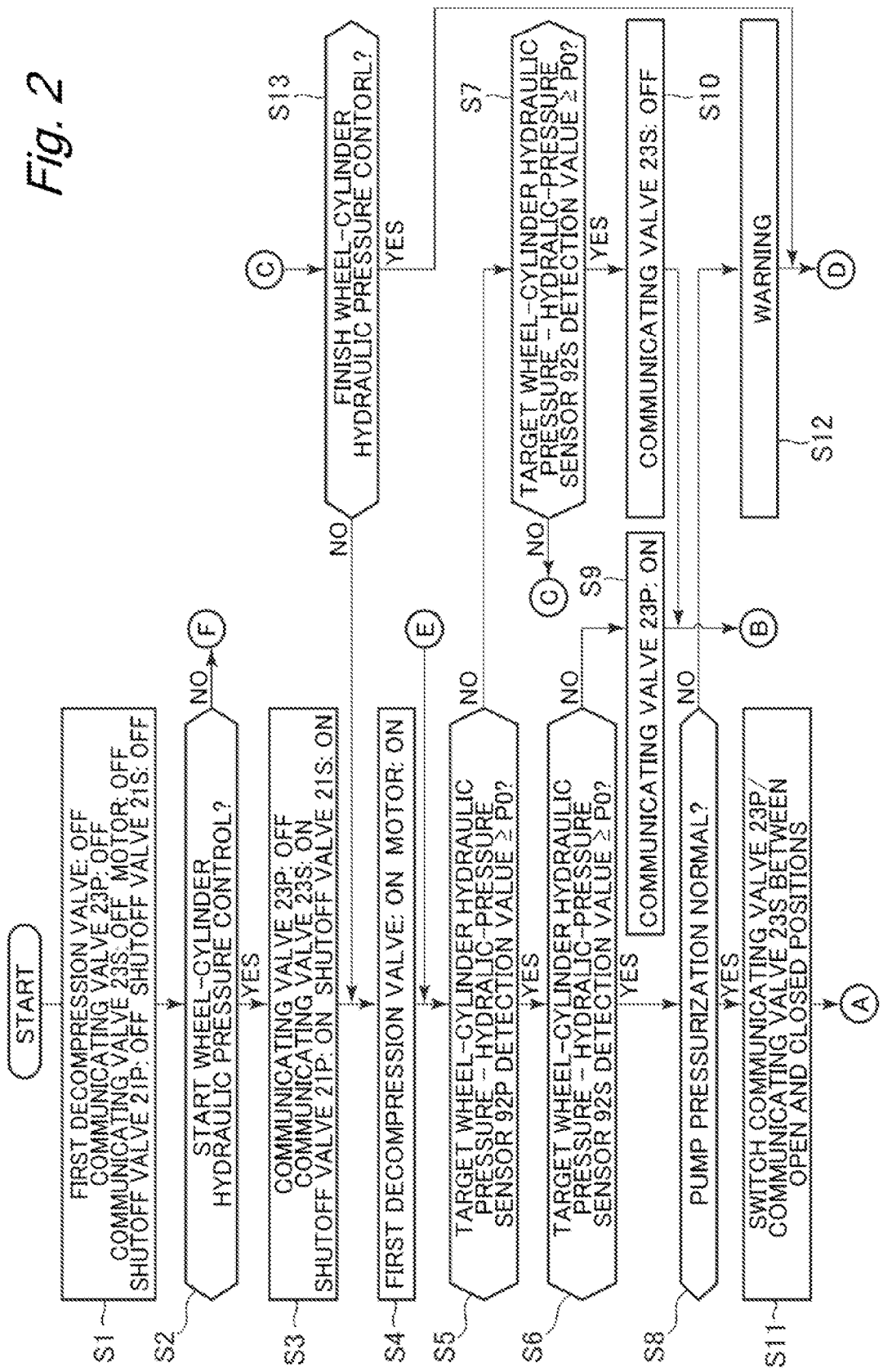
FIG. 2 is a flowchart showing a routine of fluid leakage detection control processing.
Figure 3:
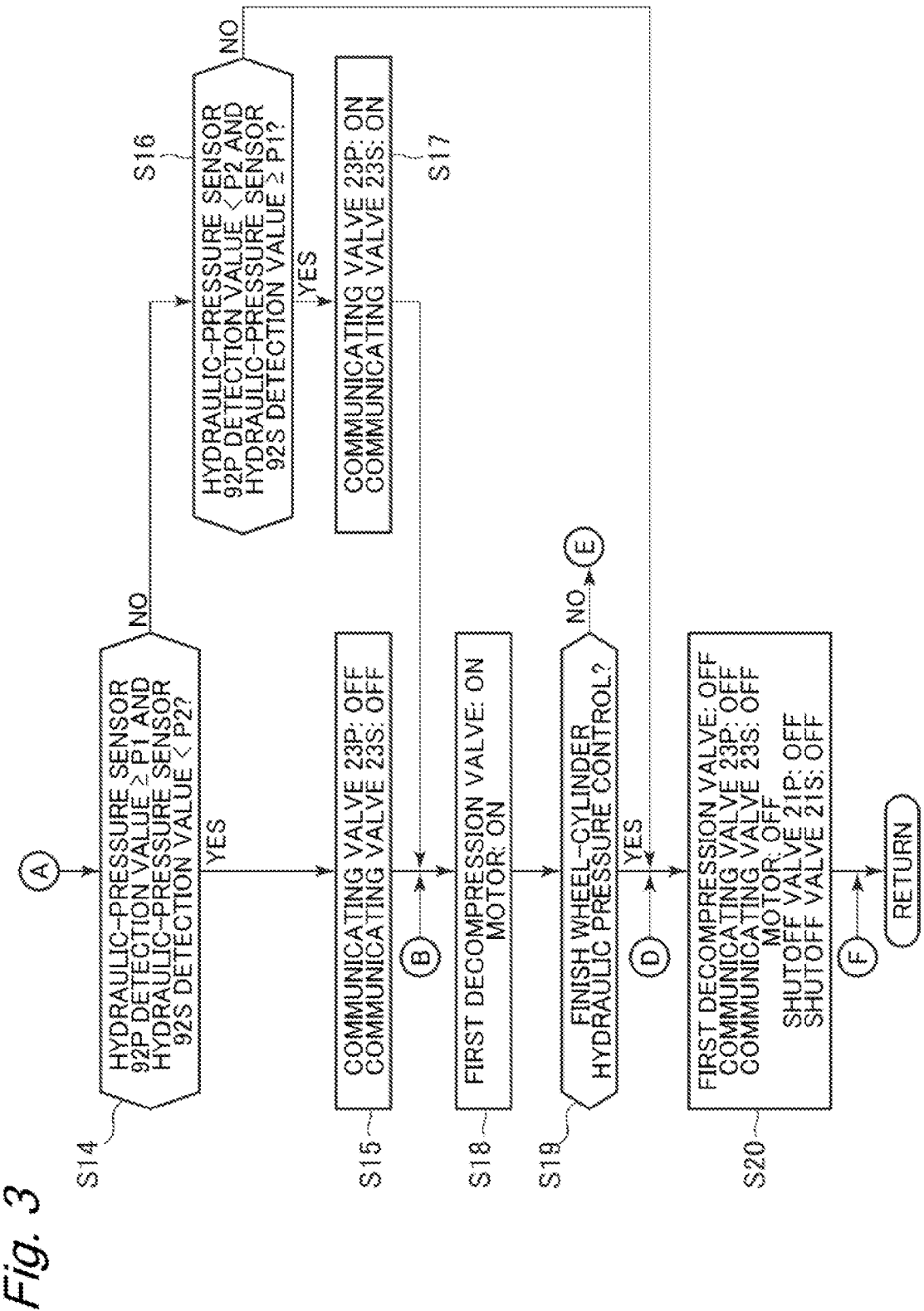
FIG. 3 is a flowchart showing a routine of fluid leakage detection control processing.

FIGS. 2 and 3 are flowcharts showing routines of fluid leakage detection control processing that is carried out in the ECU 100. The ECU 100 includes the target wheel-cylinder hydraulic pressure controlling unit 101 that calculates a target wheel-cylinder hydraulic pressure according to the brake pedal operation by the driver; the fluid-leakage detecting unit 102 that supplies the brake fluid to the discharge passages 13P and 13S by means of the pump 7, switches the communicating valves 23P and 23S alternately between the open and closed positions more than once, and detects a brake-fluid leakage in the fluid passage 11 on the basis of magnitudes of detection values detected by the hydraulic-pressure sensors 92P and 92S during the open-close switching of the communicating valves 23P and 23S; and the pump pressurization checking unit 103 that drives the pump 7 to generate a pump discharge pressure with the communicating valves 23P and 23S closed, and makes a determination as to whether the pump pressurization is normal on the basis of whether the detection value of the hydraulic-pressure sensor 93 is equal to or larger than a predetermined value P3.

Step S1 switches off the first decompression valve 24, the communicating valves 23P and 23S, the shutoff valves 21P and 21S, and the motor M.

Step S2 makes a determination as to whether the wheel-cylinder hydraulic pressure control is started. If the determination is YES, the routine proceeds to Step S3. If the determination is NO, the routine proceeds to RETURN.

Step S3 switches off the communicating valve 23P and switches on the communicating valve 23S and the shutoff valves 21P and 21S.

Step S4 switches on the first decompression valve 24 and the motor M.

Step S5 makes a determination as to whether difference between the target wheel-cylinder hydraulic pressure and the detection value of the hydraulic-pressure sensor 92P is equal to or larger than a predetermined value P0. If the determination is YES, the routine proceeds to Step S6. If the determination is NO, the routine proceeds to Step S7. The target wheel-cylinder hydraulic pressure is either one of target wheel cylinders of the wheel cylinders 8a and 8d of the P-system, which is larger than the other. The value P0 is a value that gives a presumption that there is a fluid leakage.

Step S6 makes a determination as to whether difference between the target wheel-cylinder hydraulic pressure and the detection value of the hydraulic-pressure sensor 92S is equal to or larger than the predetermined value P0. If the determination is YES, the routine proceeds to Step S8. If the determination is NO, the routine proceeds to Step S9. The target wheel-cylinder hydraulic pressure is either one of target wheel-cylinder hydraulic pressures of the wheel cylinders 8c and 8b of the S-system, which is larger than the other.

Step S7 makes a determination as to whether difference between the target wheel-cylinder hydraulic pressure and the detection value of the hydraulic-pressure sensor 92S is equal to or larger than the predetermined value P0. If the determination is YES, the routine proceeds to Step S10. If the determination is NO, the routine proceeds to Step S13. The target wheel-cylinder hydraulic pressure is either one of target wheel-cylinder hydraulic pressures of the wheel cylinders 8c and 8b of the S-system, which is larger than the other. The value P0 is a value that gives a presumption that there is a fluid leakage.

Step S8 generates a pump discharge pressure by driving the pump 7 with the communicating valves 23P and 23S closed (communicating valve 23P is ON; and the communicating valve 23S is OFF) and with the first decompression valve 24 closed, makes a determination as to whether the pump pressurization is normal (pump pressurization checking unit 103) on the basis of whether the detection value of the hydraulic-pressure sensor 93 is equal to or larger than a predetermined value P3. If the determination is YES, the routine proceeds to Step S11. If the determination is NO, the routine proceeds to Step S12.

Step S9 switches on the communicating valve 23P.

Step S10 switches off the communicating valve 23S.

Step S11 switches the communicating valves 23P and 23S alternately between the open and closed positions more than once. In Embodiment 1, the opening and closing of the communicating valves 23P and 23S are switched between each other every predetermined period (several to several tens of milliseconds) during prescribed time (300 milliseconds, for example).

Step S12 alerts the driver to a malfunction of the pump 7 by lighting a warning lamp or the like.

Step S13 makes a determination as to whether the wheel-cylinder hydraulic pressure control is finished. If the determination is YES, the routine proceeds to Step S20. If the determination is NO, the routine proceeds to Step S4.

Step S14 makes a determination as to whether the detection value of the hydraulic-pressure sensor 92P is equal to or larger than a predetermined value P1, and whether the detection value of the hydraulic-pressure sensor 92S is smaller than a predetermined value P2. If the determination is YES, the routine proceeds to Step S15. If the determination is NO, the routine proceeds to Step S16.

Step S15 switches off the communicating valves 23S and 23P.

Step S16 makes a determination as to whether the detection value of the hydraulic-pressure sensor 92P is smaller than the predetermined value P2, and whether the detection value of the hydraulic-pressure sensor 92S is equal to or larger than the predetermined value P1. If the determination is YES, the routine proceeds to Step S17. If the determination is NO, the routine proceeds to Step S20.

Step S17 switches on the communicating valves 23P and 23S.

Step S18 switches on the first decompression valve 24 and the motor M.

Step S19 makes a determination as to whether the wheel-cylinder hydraulic pressure control is finished. If the determination is YES, the routine proceeds to Step S20. If the determination is NO, the routine proceeds to Step S5.

Step S20 switches off the first decompression valve 24, the communicating valves 23P and 23S, the shutoff valves 21P and 21S, and the motor M.

Operation will now be described below.

(Operation at Boost Control)

Figure 4:
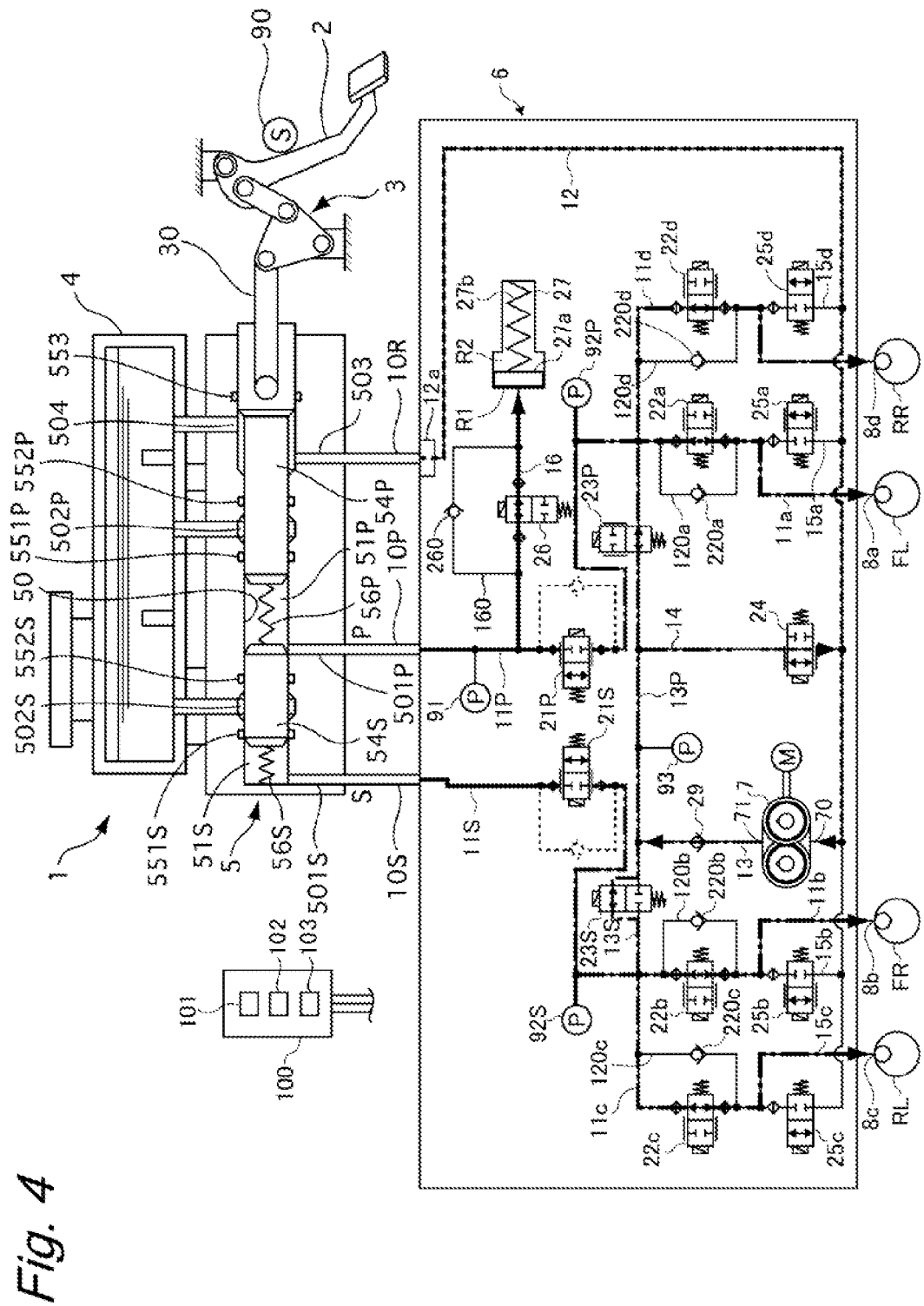
FIG. 4 shows an operating condition of the hydraulic pressure unit during boost control.

FIG. 4 shows an operating condition of the hydraulic pressure unit 6 during boost control.

When the brake operation is carried out, the ECU 100 drives the pump 7. At the same time, the ECU 100 controls the shutoff valve 21 in a closing direction and controls the communicating valve 23S in an opening direction. The pump 7 sucks in the brake fluid from the reservoir 4 through the suction fluid passage 12 and discharges the brake fluid to the discharge passages 13 (13P, 13S) to supply the brake fluid through the fluid passage 11 toward the wheel cylinders 8, to thereby increase the wheel-cylinder hydraulic pressure. The ECU 100 controls the rotating speed of the pump 7 (the amount of supply from the pump 7 to the discharge passage 13) on the basis of the detection values of the hydraulic-pressure sensors 92 and 93, and thus carries out boost control so that the wheel-cylinder hydraulic pressure is the target wheel-cylinder hydraulic pressure that makes it possible to obtain a desired boost ratio. The simulator shutoff valve 26 is operated to open, so that the brake fluid supplied from the master cylinder 5 can be absorbed by the stroke simulator 27, to thereby materialize a good pedal feeling.

According to the fluid leakage detection control processing shown in FIGS. 2 and 3, at the time of boost control, the routine moves from S1 to S2 to S3 to S4 to S5 to S7 to S13. The process from S4 to S5 to S7 to S13 is repeated until the boost control is finished.

(Operation at Power Supply Failure)

Figure 5:
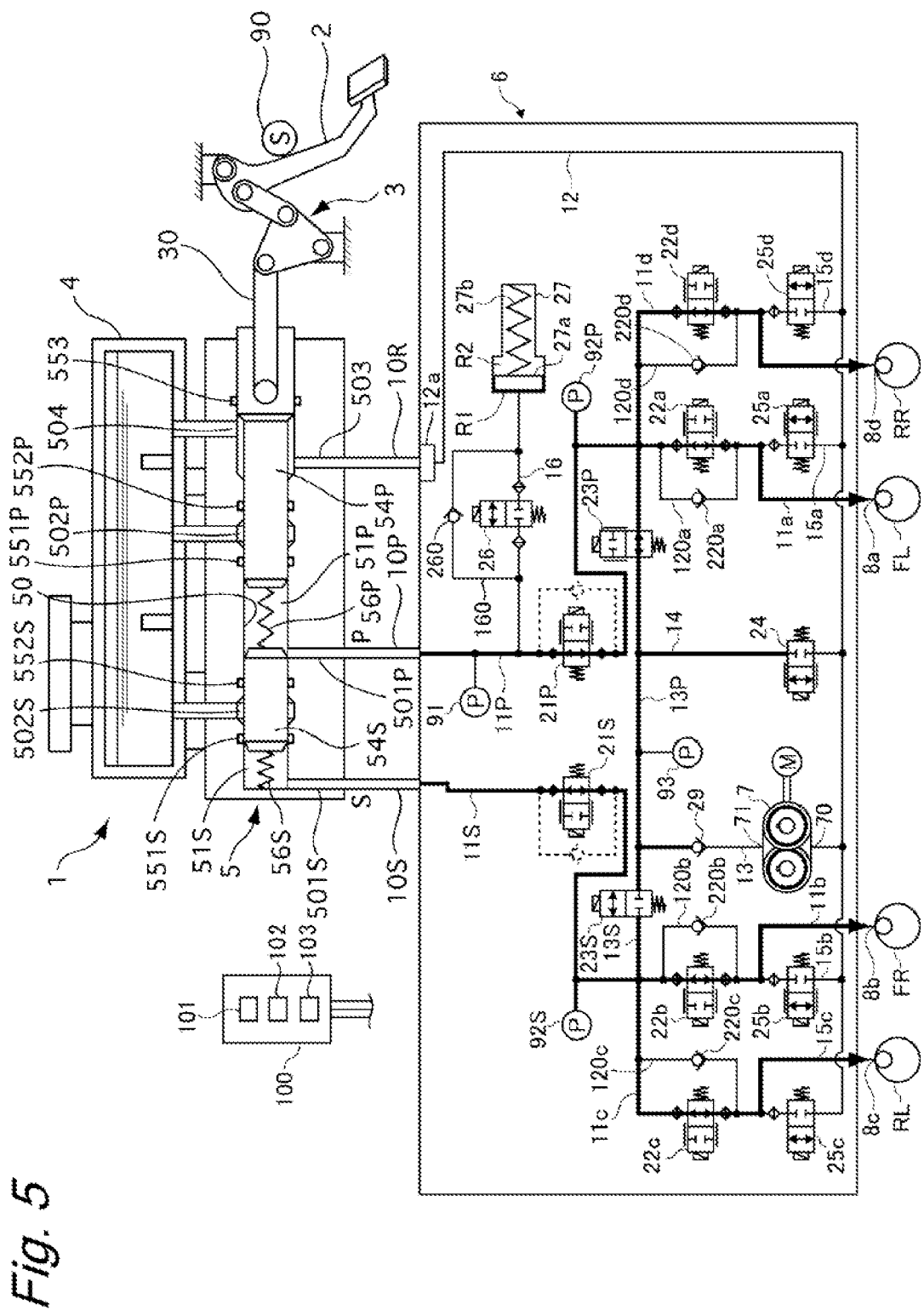
FIG. 5 shows an operating condition of the hydraulic pressure unit during a power supply failure.

FIG. 5 shows an operating condition of the hydraulic pressure unit 6 during a power supply failure.

At the time of a power supply failure, the pump 7 of the hydraulic pressure unit 6 is not operated, and the electromagnetic valves 21 and the like come into an initial condition in a power-off state. The master-cylinder hydraulic pressure generated by the depression of the brake pedal 2 is then supplied through the fluid passage 11 to the wheel cylinders 8, which generates the wheel-cylinder hydraulic pressure according to the brake operation force. At this time, the driver's pedal depressing force is amplified by the link mechanism 3. The simulator shutoff valve 26 is closed, which prevents a portion of the brake fluid supplied to the fluid passage 11 from being absorbed by the stroke simulator 27.

(Operation when there is a Fluid Leakage Defect)

Figure 6:
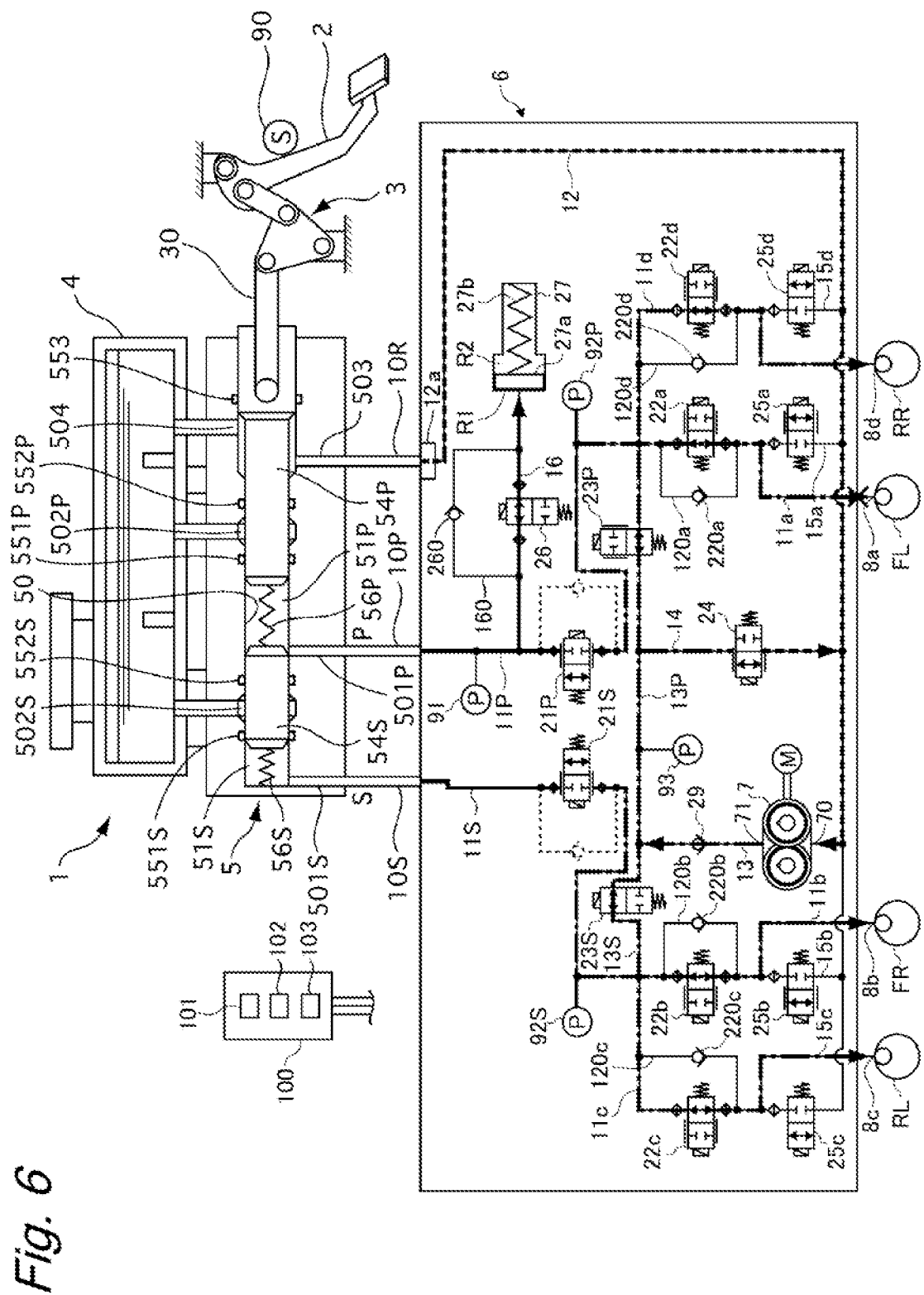
FIG. 6 shows a state in which a fluid leakage occurs in a P-system during boost control.

FIG. 6 shows a state in which a fluid leakage defect occurs in the P-system (left front wheel FL) during boost control.

If a fluid leakage defect occurs during the boost control, the wheel-cylinder hydraulic pressures of both the systems are decreased. In the fluid leakage detection control processing shown in FIGS. 2 and 3, therefore, the routine proceeds from S1 to S2 to S3 to S4 to S5 to S6 to S8. More specifically, Steps S5 and S6 determine that a deviation between the target wheel-cylinder hydraulic pressure and each of the wheel-cylinder hydraulic pressures is equal to or larger than the predetermined value P0. Step S8 continues to operate the pump 7, and Step S11 alternately switches the communicating valves 23P and 23S between the open and closed positions to supply the brake fluid to the systems alternately. At this time, while the wheel-cylinder hydraulic pressures of the normal S-system are gradually increased, the wheel-cylinder hydraulic pressures of the P-system with the fluid leakage are not increased. The routine therefore proceeds from S14 to S16, which identifies that the system with the fluid leakage is the P-system. During the processing by Step S8, the wheel-cylinder hydraulic pressures of the normal S-system are gradually increased due to the supply of the brake fluid, so that the system with the fluid leakage can be identified while the braking force is being generated.

Figure 7:
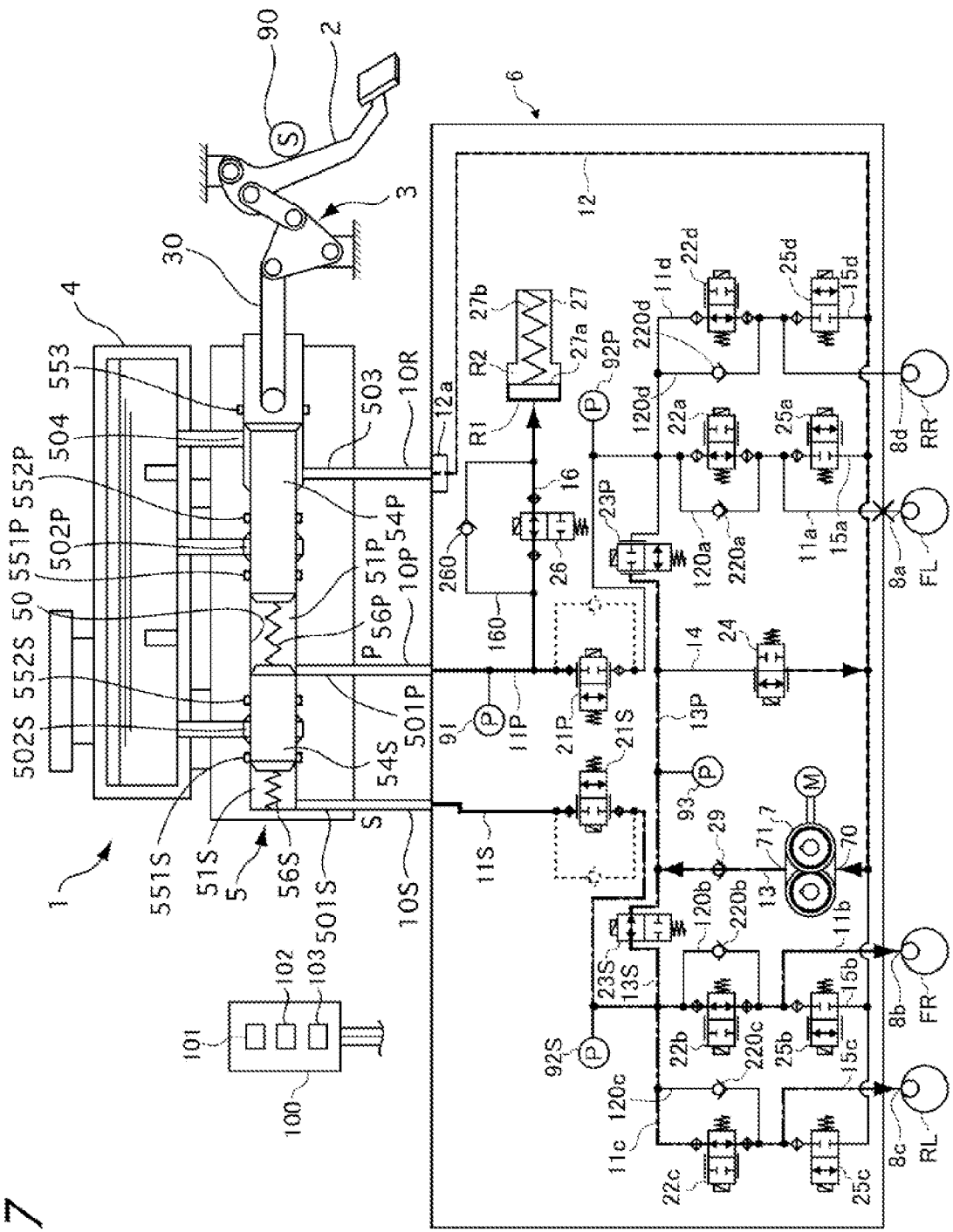
FIG. 7 shows an operating condition of the hydraulic pressure unit in a case where a fluid leakage occurs in the P-system during boost control.

After a fluid leak spot is identified, Step S17 closes the communicating valve 23P of the P-system with the defect and opens the communicating valve 23S of the normal S-system, while the pump 7 being operated. It is then possible, as shown in FIG. 7, to continue the boost control by using only the wheel cylinders 8b and 8c of the normal S-system, and secure a necessary braking force.

(Specific Operation in the System with a Fluid Leakage Defect)

Figure 8:
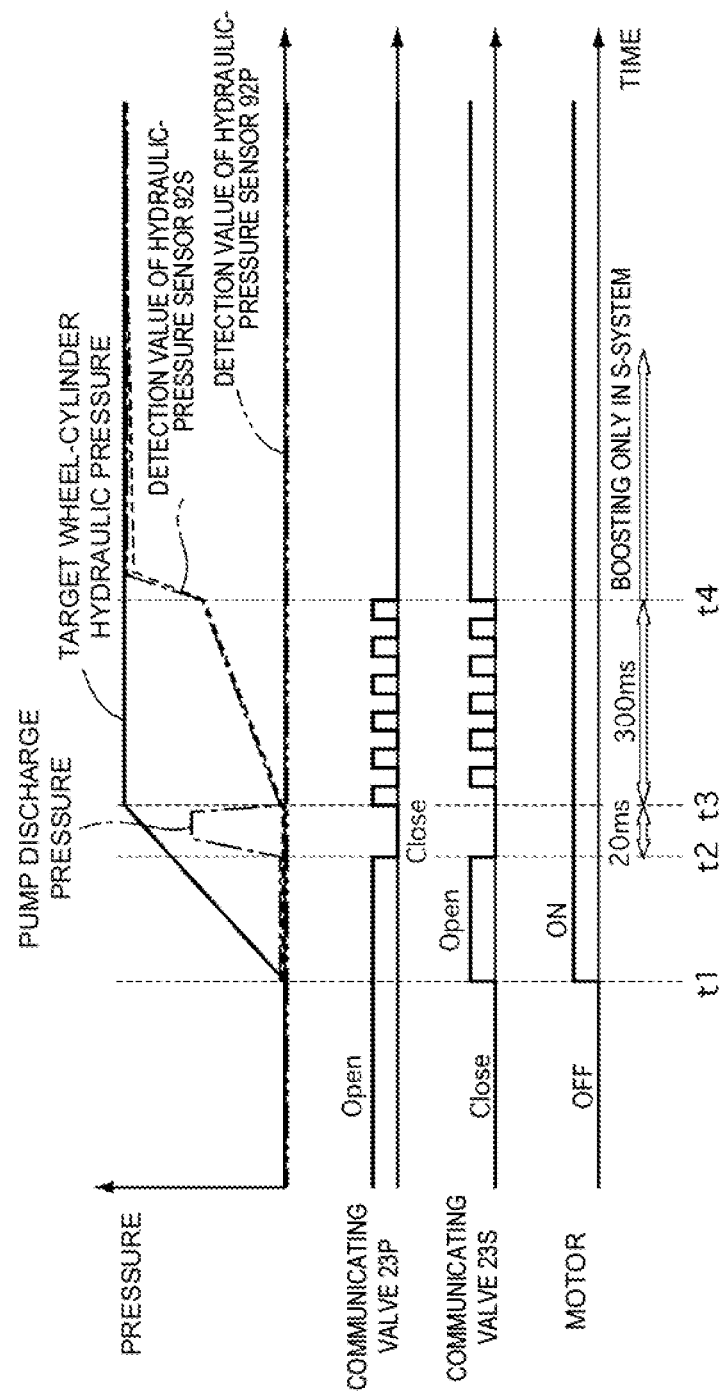
FIG. 8 is a time chart in a case where a fluid leakage occurs in the P-system during boost control in Embodiment 1.

FIG. 8 is a time chart in a case where a fluid leakage defect occurs in the P-system during boost control in Embodiment 1.

At a time point t1, the driver starts depressing the brake pedal 2, and the pump 7 (motor M) is also activated.

In a time interval between the time point t1 and a time point t2, difference between the target wheel-cylinder hydraulic pressure and the detection values of the hydraulic-pressure sensors 92P and 92S is increased by degrees.

At the time point t2, a deviation between the target wheel-cylinder hydraulic pressure and the detection values of the hydraulic-pressure sensors 92P and 92S is equal to or larger than the predetermined value P0, and a fluid leakage defect is detected.

In a time interval between time points t3 and t4, the communicating valves 23P and 23S are alternately switched between open and closed positions to supply the brake fluid to the systems alternately while the pump 7 is being operated. In the result, while the detection value of the hydraulic-pressure sensor 92P of the defective P-system is not increased, the detection value of the hydraulic-pressure sensor 92S of the normal S-system is increased by degrees. Since the wheel-cylinder hydraulic pressure of the S-system is increased, the defective system can be checked while the braking force is being generated.

At the time point t4, the difference between the detection values of the hydraulic-pressure sensors 92P and 92S is equal to or larger than a predetermined value P4 (=P1-P2) (corresponding to S16 of FIG. 3), so that it is determined that the fluid leakage defect occurs in the P-system. The communicating valve 23P of the P-system is then closed, and the communicating valve 23S of the S-system is opened, while the pump 7 being operated, to thereby increase the wheel-cylinder hydraulic pressure of the wheel cylinders 8b and 8c of the S-system up to the target wheel-cylinder hydraulic pressure. The predetermined value P4 is a value corresponding to differential pressure of the P- and S-systems, which is sufficient to identify the system with the fluid leakage defect. The predetermined value P4 is, for example, approximately 1 MPa.

As described above, in the fluid leakage detection control processing of Embodiment 1, the communicating valves 23P and 23S are alternately switched between the open and closed positions more than once, and the system in which the fluid leakage defect occurs is identified on the basis of magnitudes of the detection values of the hydraulic-pressure sensors 92P and 92S. This makes it possible to identify the system in which the fluid leakage defect occurs while generating the braking force. Assuming that the opening and closing of the communicating valves are each performed one time, and an opening duration is set longer, if there is a fluid leakage in the system supplied with the brake fluid by opening the communicating valve ahead of the other system, a problem occurs that the braking force cannot be generated for a long period of time. In contrast, Embodiment 1 switches the communicating valves 23P and 23S alternately between the open and closed positions more than once. For this reason, when there is a fluid leakage defect in either system, it is possible to identify the system in which the fluid leakage defect occurs while generating the braking force. Furthermore, since the communicating valves are alternately switched between the open and closed positions with a predetermined period (several to several tens of milliseconds), the wheel-cylinder hydraulic pressures of the normal system can be increased with respect to each predetermined period in a constant ratio, leading to a stable increase of the braking force.

Since the fluid leakage detection is carried out when the deviation between the target wheel-cylinder hydraulic pressure and the detection values of the hydraulic-pressure sensors 92P and 92S is equal to or larger than the predetermined value P0, even if a fluid leakage defect occurs during the control of the wheel-cylinder hydraulic pressure, a sufficient braking force can be secured by using the wheel cylinders of the normal system.

After the fluid leakage defect is detected, the communicating valve 23 of the system in which there is the fluid leakage is closed, and the communicating valve 23 of the normal system is opened. After the detection of the fluid leakage, therefore, a sufficient braking force can be secured.

[Pump Pressurization Checking Operation]

In the fluid leakage detection control processing of Embodiment 1, as shown by the time interval between the time points t2 and t3 of FIG. 8, the communicating valves 23P and 23S are closed, and the pump 7 is operated. The pressurization of the pump 7 is checked on the basis of the detection value of the hydraulic-pressure sensor 93 (corresponding to Step S8 of FIG. 2). The closing of the communicating valves 23P and 23S and the first decompression valve 24 makes the discharge passage 13P and the first decompression fluid passage 14 a closed circuit. It can be therefore determined that the pump 7 is normally operated when the detection value of the hydraulic-pressure sensor 93 is equal to or larger than the predetermined value P3, and that there is a defect in the pump 7 when the detection value of the hydraulic-pressure sensor 93 is smaller than the predetermined value P3.

Once the first decompression valve 24 is opened, the brake fluid discharged from the pump 7 is returned from the first decompression fluid passage 14 to the suction side of the pump 7. The pressurization of the pump 7 therefore can be easily checked without feeding the brake fluid to the wheel cylinders 8 side even while the vehicle is moving.

Moreover, the pressurization of the pump 7 is checked before the fluid leakage detection (before Step S11). A defect in the pump 7 is likely to deteriorate responsiveness of the fluid leakage detection. However, since the fluid leakage detection is carried out after normal pressurization of the pump 7 is confirmed, detection responsiveness is enhanced.

Advantages will now be described below.

A brake apparatus according to Embodiment 1 has advantages listed below.

(1) There are provided the pump 7 configured to supply the plurality of wheel cylinders 8a to 8d with a brake fluid pressure corresponding to the brake pedal operation by the driver; the fluid passage 11P and the discharge passage 13P connecting the pump 7 to the wheel cylinders 8a and 8d; the fluid passage 11S and the discharge passage 13S connecting the pump 7 to the wheel cylinders 8b and 8c; a communicating valve 23P placed in the discharge passage 13P to be located between the wheel cylinders 8a and 8d and the pump 7; the communicating valve 23S placed in the discharge passage 13S to be located between the wheel cylinders 8b and 8c and the pump 7; the hydraulic-pressure sensor 92P placed in the fluid passage 11P and detecting a hydraulic pressure existing between the shutoff valve 21 and the booster valve 22; the hydraulic-pressure sensor 92S placed in the fluid passage 11S and detecting a hydraulic pressure existing between the shutoff valve 21 and the booster valve 22; and the fluid-leakage detecting unit 102 that supplies the brake fluid to the discharge passages 13P and 13S by means of the pump 7, switches the communicating valves 23P and 23S alternately between the open and closed positions more than once, and detects a brake-fluid leakage in the fluid passage 11 on the basis of magnitudes of the detection values detected by the hydraulic-pressure sensors 92P and 92S during the open-close switching of the communicating valves 23P and 23S.

It is thus possible to identify the system in which the fluid leakage defect occurs while generating the braking force.

(2) There is provided the target wheel-cylinder hydraulic pressure controlling unit 101 that calculates the target wheel-cylinder hydraulic pressure corresponding to the brake pedal operation by the driver. When a deviation between the target wheel-cylinder hydraulic pressure calculated during the brake pedal operation by the driver and the detection values of the hydraulic-pressure sensors 92P and 92S are equal to or larger than the predetermined value P0, the fluid leakage detection by the fluid-leakage detecting unit 102 is carried out.

This makes it possible to secure a sufficient braking force even if the fluid leakage defect occurs during the control of the wheel-cylinder hydraulic pressure.

(3) The communicating valve corresponding to the fluid passage, in which fluid leakage is detected by the fluid-leakage detecting unit 102, is driven in a closing direction, and the other communicating valve is driven in an opening direction.

This makes it possible to secure a sufficient braking force by means of the system in which there is no fluid leakage defect after the system in which the fluid leakage defect occurs is identified.

(4) There are provided the fluid passages 11a and 11d of the P-system including the wheel cylinders 8a and 8d that can be pressurized with the master-cylinder hydraulic pressure generated by the first fluid chamber 51P of the master cylinder 5 that generates a brake fluid pressure in response to the brake pedal operation by the driver; the fluid passages 11b and 11c of the S-system including the wheel cylinders 8b and 8c that can be pressurized with the master-cylinder hydraulic pressure generated by the first fluid chamber 51S of the master cylinder 5; the discharge passage 13 connecting the fluid passages 11a and 11d of the P-system to the fluid passages 11b and 11c of the S-system; the pump 7 that discharges the brake fluid to the discharge passage 13; the communicating valve 23P placed in the discharge passage 13 and configured to suppress the brake fluid from flowing from the discharge passage 13 to the fluid passages 11a and 11d of the P-system; the communicating valve 23S configured to suppress the brake fluid from flowing to the fluid passages 11b and 11c of the S-system; the hydraulic-pressure sensor 92P placed in the P-system; the hydraulic-pressure sensor 92S placed in the S-system; and the fluid-leakage detecting unit 102 that drives the pump 7, repeats alternate open-close switching of the communicating valves 23P and 23S more than once to pump the brake fluid into the systems, and detects a brake-fluid leakage in the systems on the basis of the detection values of the hydraulic-pressure sensors 92P and 92S.

This makes it possible to identify the system in which the fluid leakage occurs while generating the braking force.

(5) There are provided the fluid passages 11a and 11d of the P-system including the wheel cylinders 8a and 8d that can be pressurized with the master-cylinder hydraulic pressure generated by the first fluid chamber 51P of the master cylinder 5 that generates the brake fluid pressure in response to the brake pedal operation by the driver; the fluid passages 11b and 11c of the S-system including the wheel cylinders 8c and 8d that can be pressurized with the master-cylinder hydraulic pressure generated by the first fluid chamber 51S of the master cylinder 5; the discharge passage 13 connecting the fluid passages 11a and 11d of the P-system to the fluid passages 11b and 11c of the S-system; the pump 7 that discharges the brake fluid to the discharge passage 13; the communicating valve 23P placed in the discharge passage 13 and configured to suppress the brake fluid from flowing from the discharge passage 13 to the fluid passages 11a and 11d of the P-system; the communicating valve 23S configured to suppress the brake fluid from flowing to the fluid passages 11b and 11c of the S-system; the hydraulic-pressure sensor 92P placed in the P-system; the hydraulic-pressure sensor 92S placed in the S-system; the target wheel-cylinder hydraulic pressure controlling unit 101 that drives the pump 7 to obtain the target wheel-cylinder hydraulic pressure calculated on the basis of the brake pedal operation by the driver; and the fluid-leakage detecting unit 102 that repeats alternate open-close switching of the communicating valves 23P and 23S more than once to pump the brake fluid into the systems during the control conducted by the target wheel-cylinder hydraulic pressure controlling unit, and detects a brake-fluid leakage in the systems on the basis of the detection values of the hydraulic-pressure sensors 92P and 92S.

This makes it possible to identify the system in which the fluid leakage defect occurs while generating the braking force.

Embodiment 2

The Embodiment 2 differs from Embodiment 1 in that Embodiment 2 varies a period for switching the opening and closing durations of the communicating valves 23P and 23S during the fluid leakage detection, according to the detection values of the hydraulic-pressure sensors 92P and 92S.

[Fluid Leakage Detection Control Processing]

The routine of the fluid leakage detection control processing according to Embodiment 2 is roughly similar to that of the fluid leakage detection control processing according to Embodiment 1 shown in FIGS. 2 and 3. Only difference is Step S11.

Figure 9:
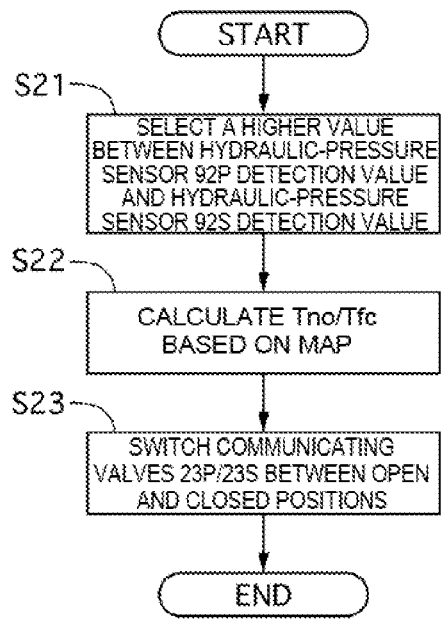
FIG. 9 is a flowchart showing a routine of processing for opening and closing communicating valves of an Embodiment 2.

In Step S11, Embodiment 2 carries out processing for opening and closing the communicating valves as shown in FIG. 9.

[Processing for Opening and Closing the Communicating Valves]

FIG. 9 is a flowchart showing the routine of processing for opening and closing the communicating valves according to Embodiment 2.

Step S21 selects a larger value between the detection value of the hydraulic-pressure sensor 92P and that of the hydraulic-pressure sensor 92S.

Figure 10:
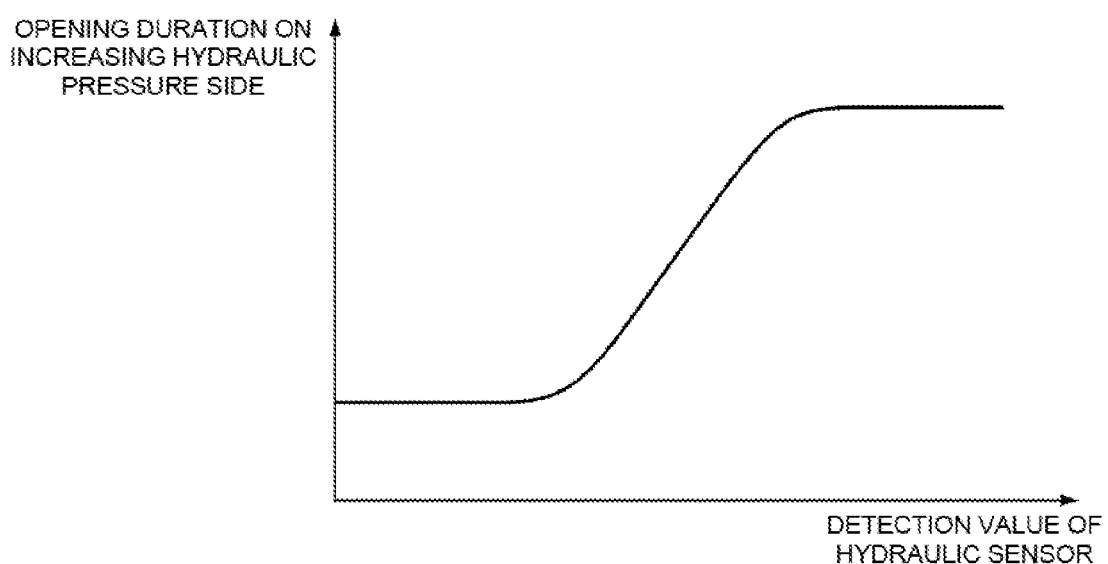
FIG. 10 is a map of setting of opening duration on an increasing hydraulic pressure side according to a detection value of a hydraulic-pressure sensor 92P or a hydraulic-pressure sensor 92S.

On the basis of a map shown in FIG. 10, Step S22 calculates opening duration $T_{no}$ of the communicating valve on an increasing hydraulic pressure side (side in which the detection value of the hydraulic-pressure sensor is increased), (which is equal to closing duration $T_{fc}$ of the communication valve on a non-increasing hydraulic pressure side) from the detection value of the hydraulic-pressure sensor 92P or 92S which has been selected in Step S21. FIG. 10 is a map of setting of the opening duration on the increasing hydraulic pressure side corresponding to the detection value. The opening duration $T_{no}$ of the communicating valve on the increasing hydraulic pressure side (which is equal to closing duration $T_{fc}$ of the communicating valve on the non-increasing hydraulic pressure side) is set longer as the detection value of the hydraulic-pressure sensor is increased. Upper and lower limits are set to the opening duration $T_{no}$.

Step S23 switches the communicating valves 23P and 23S alternately between the open and closed positions on the basis of the opening duration on the increasing hydraulic pressure side, which has been set in Step S22. In Embodiment 1, the opening duration of the communicating valve on the non-increasing hydraulic pressure side is equal to the lower limit of the map of FIG. 10.

The other configurations are identical to those in Embodiment 1, and the illustration and descriptions thereof will be omitted.

Operation will now be described below.

Figure 11:
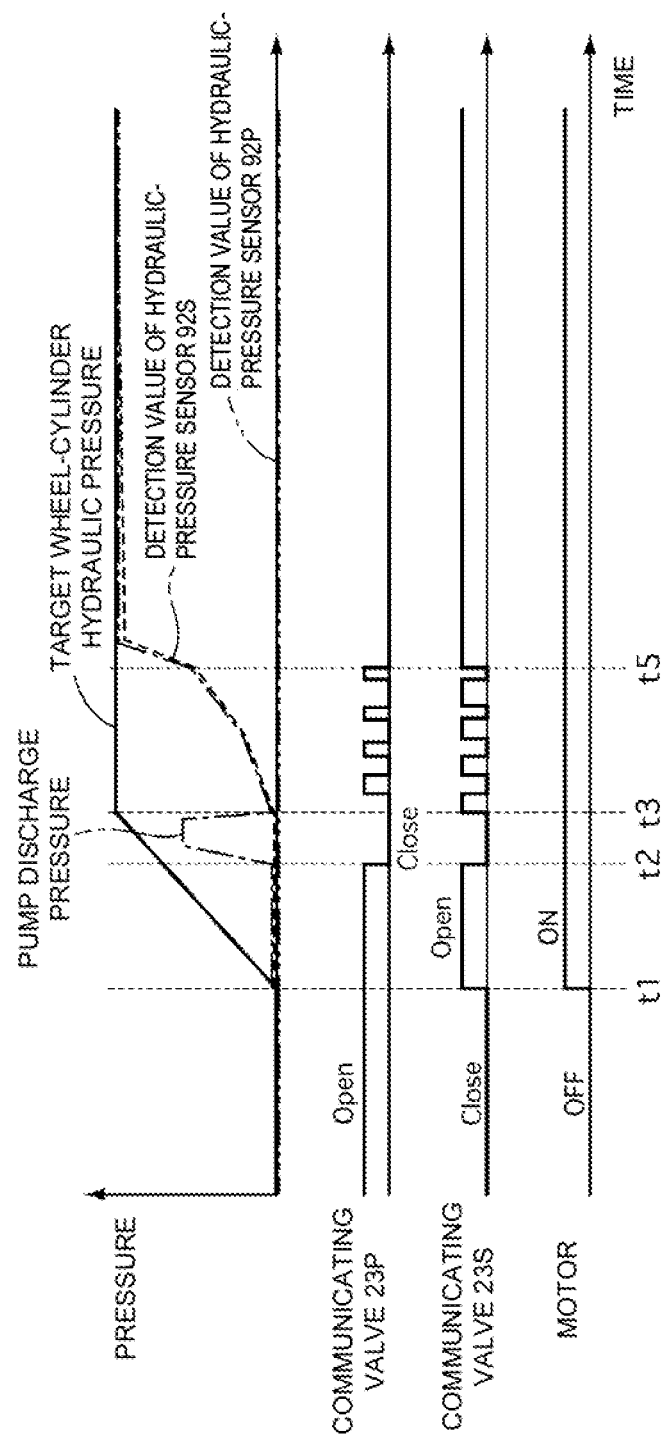
FIG. 11 is a time chart in a case where a fluid leakage occurs in the P-system during boost control in Embodiment 2.

FIG. 11 is a time chart in a case where a fluid leakage occurs in the P-system during boost control in Embodiment 2.

A time interval between time points t1 and t3 is the same as that between t1 and t3 shown in FIG. 8.

In a time interval between time points t3 and t5, the communicating valves 23P and 23S are alternately switched between the open and closed positions while the pump 7 is being operated, to thereby supply the brake fluid to the systems alternately. At this time, according to Embodiment 2, the opening duration of the communicating valve 23S of the S-system in which the hydraulic pressure is increased becomes longer by degrees. To be more specific, the wheel cylinders 8b and 8c of the normal S-system are supplied with more brake fluid than the wheel cylinders 8a and 8d of the P-system in which the fluid leakage defect occurs. As compared to Embodiment 1, consequently, Embodiment 2 more quickly identifies the system in which the defect occurs, and also more quickly secures the braking force generated by the normal system.

The other operations are the same as those of Embodiment 1.

Advantages will now be described below.

A brake apparatus of Embodiment 2 has advantages below in addition to the advantages (1) to (5) of Embodiment 1.

(6) A predetermined period for switching the opening and closing durations of the communicating valves 23P and 23S is increased along with increase of the hydraulic pressure detected by the hydraulic-pressure sensor 92P or 92S. More specifically, the opening duration of the communicating valve 23P or 23S of the system in which the detection value of the hydraulic-pressure sensor 92P or 92S is larger is set longer as the detection value of the hydraulic-pressure sensor is increased. In the result, the opening duration of the communicating valve of the system in which the hydraulic pressure is increased (normal system) becomes longer by degrees.

This makes it possible to accelerate the fluid leakage detection and the securement of the braking force.

Other Embodiments

Modes for carrying out the invention have been described above with reference to the embodiments. Specific configurations of the present invention, however, are not limited to those shown in the embodiments. Design changes or the like which are made within the scope not deviating from the spirit of the invention are included in the invention.

Figure 12:
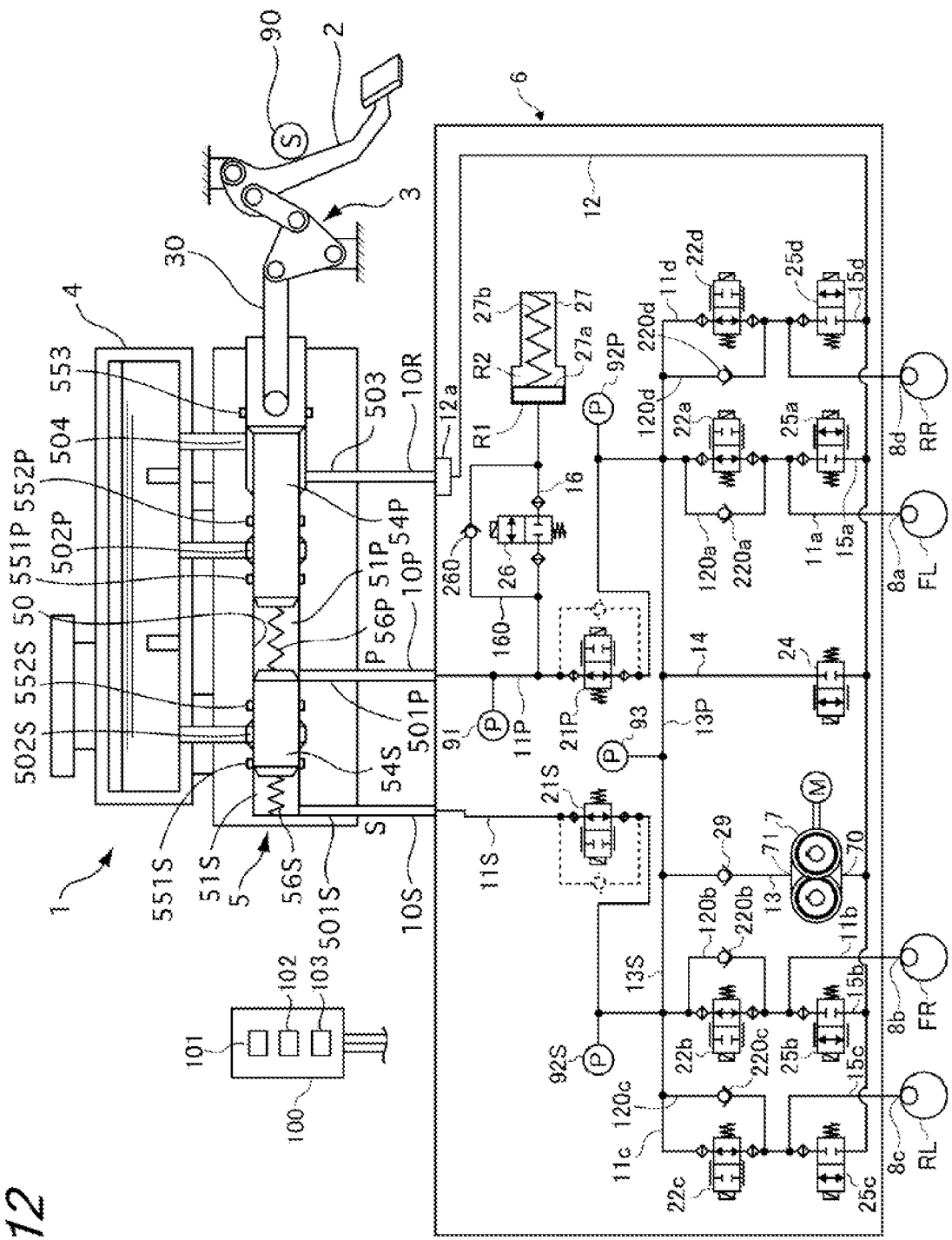
FIG. 12 shows a hydraulic circuit of a hydraulic pressure unit according to another embodiment.

FIG. 12 shows a hydraulic circuit of the hydraulic pressure unit 6 according to another embodiment. As compared to Embodiment 1 shown in FIG. 1, the communicating valves 23P and 23S are omitted. As with the above embodiments, the present embodiment is able to identify the system in which the fluid leakage defect occurs by switching the booster valves 22a and 22d of the P-system and the booster valves 22b and 22c of the S-system alternately between open and closed positions more than once.

(a) A brake apparatus according to one aspect of the invention relates to a brake apparatus including:

a hydraulic-pressure source configured to supply a plurality of wheel cylinders with a brake fluid pressure corresponding to a brake pedal operation by a driver;

a first fluid passage configured to connect the hydraulic-pressure source to a first wheel cylinder that is at least one of the wheel cylinders;

a second fluid passage configured to connect the hydraulic-pressure source to a second wheel cylinder that is another of the wheel cylinders;

a first control valve placed in the first fluid passage to be located between the first wheel cylinder and the hydraulic-pressure source;

a second control valve placed in the second fluid passage to be located between the second wheel cylinder and the hydraulic-pressure source;

a first hydraulic-pressure sensor placed in the first fluid passage and configured to detect a hydraulic pressure existing between the first control valve and the hydraulic-pressure source;

a second hydraulic-pressure sensor placed in the second fluid passage and configured to detect a hydraulic pressure existing between the second control valve and the hydraulic-pressure source; and a fluid-leakage detecting unit configured to supply a brake fluid to the first and second fluid passages through the hydraulic-pressure source, switch the first and second control valves alternately between open and closed positions more than once, and detect a brake-fluid leakage in the first or second fluid passage on the basis of magnitudes of detection values detected by the first and second hydraulic-pressure sensors during the open-close switching of the first and second control valves.

(b) The brake apparatus according to one aspect of the invention may have a configuration including:

a target wheel-cylinder hydraulic pressure controlling unit configured to calculate a target wheel-cylinder hydraulic pressure corresponding to the brake pedal operation by the driver, in which the fluid-leakage detecting unit is configured to carry out fluid leakage detection processing when a deviation between the target wheel-cylinder hydraulic pressure calculated during the brake pedal operation by the driver and detection values of the first and second hydraulic-pressure sensors is larger than a predetermined deviation.

(c) The brake apparatus according to one aspect of the invention may have a configuration in which the control valve corresponding to the fluid passage in which fluid leakage is detected by the fluid-leakage detecting unit is driven in a closing direction, and the other control valve is driven to an opening direction.

(d) The brake apparatus according to one aspect of the invention may have a configuration in which the fluid-leakage detecting unit is configured to switch the first and second control valves alternately between the open and closed positions with a predetermined period.

This leads to a stable increase of the braking force.

(e) The brake apparatus according to one aspect of the invention may have a configuration in which the predetermined period is increased along with increase of the hydraulic pressure detected by the first or second hydraulic-pressure sensor.

This makes it possible to accelerate the fluid leakage detection and the securement of the braking force.

(f) A brake apparatus according to another aspect of the invention relates to a brake apparatus including:

a fluid passage of a primary system having a plurality of wheel cylinders which can be pressurized with master-cylinder hydraulic pressure generated by a first chamber of a master cylinder that generates a brake fluid pressure in response to a brake pedal operation by a driver;

a fluid passage of a secondary system having a plurality of wheel cylinders which can be pressurized with master-cylinder hydraulic pressure generated by a second chamber of the master cylinder;

a communicating passage connecting the fluid passage of the primary system to the fluid passage of the secondary system;

a pump configured to discharge a brake fluid to the communicating passage;

first and second communicating valves placed in the communicating passage, the first communicating valve configured to suppress the brake fluid from flowing from the communicating passage to the fluid passage of the primary system, the second communicating valve configured to suppress the brake fluid from flowing from the communicating passage to the fluid passage of the secondary system;

a first hydraulic-pressure sensor placed in the primary system;

a second hydraulic-pressure sensor placed in the secondary system; and a fluid-leakage detecting unit configured to drive the pump, repeat alternate open-close switching of the first and second communicating valves more than once to pump the brake fluid into the systems, and detect a brake-fluid leakage in the systems on the basis of the detection values of the first and second hydraulic-pressure sensors.

(g) The brake apparatus according to one aspect of the invention may have a configuration including:

a target wheel-cylinder hydraulic pressure controlling unit configured to calculate a target wheel cylinder pressure corresponding to the brake pedal operation by the driver, in which the fluid-leakage detecting unit is configured to carry out fluid leakage detection processing when a deviation between the target wheel-cylinder hydraulic pressure calculated during the brake pedal operation by the driver and detection values of the first and second hydraulic-pressure sensors is larger than a predetermined deviation.

This makes it possible to secure a sufficient braking force when a fluid leakage occurs during the brake operation.

(h) The brake apparatus according to another aspect of the invention may have a configuration in which the control valve corresponding to the fluid passage in which fluid leakage is detected by the fluid-leakage detecting unit is driven in a closing direction, and another control valve is driven in an opening direction.

This makes it possible to secure a sufficient braking force after the leakage is identified.

(i) The brake apparatus according to another aspect of the invention may have a configuration including:

a discharge-pressure sensor placed in the communicating passage; and a pump pressurization checking unit 103 configured to drive the pump, control the communicating valves in a closing direction, and check the pressurization of the pump on the basis of a detection value of the discharge-pressure sensor.

This makes it possible to detect a malfunction of the pump.

(j) The brake apparatus according to another aspect of the invention may have a configuration including:

a return passage that is interposed between at least either one of the communicating valves and the pump, and configured to return the brake fluid discharged into the communicating passage to a suction side of the pump.

Since the brake fluid is returned, a malfunction of the pump can be detected without difficulty.

(k) The brake apparatus according to another aspect of the invention may have a configuration in which the pump pressurization checking unit is configured to be operated before the fluid-leakage detecting unit is activated.

Since a pressurization system is checked prior to the detection, the detection is improved in responsiveness.

(l) The brake apparatus according to another aspect of the invention may have a configuration in which the fluid-leakage detecting unit switches the first and second control valves alternately between the open and closed positions with a predetermined period.

This leads to a stable increase of the braking force.

(m) The brake apparatus according to another aspect of the invention may have a configuration in which the predetermined period is increased along with increase of the hydraulic pressure detected by the first or second pressure sensor.

This makes it possible to accelerate the fluid leakage detection and the securement of the braking force.

(n) The brake apparatus according to another aspect of the invention may have a configuration including:

a target wheel-cylinder hydraulic pressure controlling unit configured to calculate a target wheel-cylinder hydraulic pressure corresponding to the brake pedal operation by the driver;

a first malfunction judgment unit configured to calculate a deviation between the target wheel-cylinder hydraulic pressure and a detection value of the first hydraulic-pressure sensor, and determines a first malfunction when there is a deviation equal to or larger than a predetermined deviation; and a second malfunction judgment unit configured to calculate a deviation between the target wheel-cylinder hydraulic pressure and a detection value of the second hydraulic-pressure sensor, and determines a second malfunction when there is a deviation equal to or larger than a predetermined deviation.

This makes it possible to perform a malfunction judgment with respect to each system.

(o) The brake apparatus according to another aspect of the invention may have a configuration in which the fluid-leakage detecting unit is configured to be activated when both the first and second malfunction judgment units determine malfunctions.

This makes it possible to improve responsiveness of the malfunction judgment.

(p) A brake apparatus according to one aspect of the invention relates to a brake apparatus characterized by including:

a fluid passage of a primary system having a plurality of wheel cylinders which can be pressurized with master-cylinder hydraulic pressure generated by a first chamber of a master cylinder that generates a brake fluid pressure in response to a brake pedal operation by a driver;

a fluid passage of a secondary system having a plurality of wheel cylinders which can be pressurized with master-cylinder hydraulic pressure generated by a second chamber of the master cylinder;

a communicating passage connecting the fluid passage of the primary system to the fluid passage of the secondary system;

a pump configured to discharge a brake fluid to the communicating passage;

first and second communicating valves placed in the communicating passage, the first communicating valve configured to suppress the brake fluid from flowing from the communicating passage to the fluid passage of the primary system, the second communicating valve configured to suppress the brake fluid from flowing from the communicating passage to the fluid passage of the secondary system;

a first hydraulic-pressure sensor placed in the primary system;

a second hydraulic-pressure sensor placed in the secondary system;

a target wheel-cylinder hydraulic pressure controlling unit configured to drive the pump to obtain a target wheel-cylinder hydraulic pressure calculated on the basis of the brake pedal operation by the driver; and a fluid-leakage detecting unit configured to repeat alternate open-close switching of the first and second communicating valves more than once during the control by the target wheel-cylinder hydraulic pressure controlling unit to pump the brake fluid into the systems, and detect a brake-fluid leakage in the systems on the basis of the detection values of the first and second hydraulic-pressure sensors.

(q) The brake apparatus according to one aspect of the invention may have a configuration in which the communicating valve corresponding to the system in which fluid leakage is detected by the fluid-leakage detecting unit is driven in a closing direction, and the other communicating valve is driven in an opening direction.

This makes it possible to secure a sufficient braking force after the leakage is identified.

(r) The brake apparatus according to one aspect of the invention may have a configuration including:

a discharge-pressure sensor placed in the communication passage; and a pump pressurization checking unit configured to drive the pump, control the communicating valves in a closing direction, and check the pressurization of the pump on the basis of a detection value of the discharge-pressure sensor.

This makes it possible to detect a malfunction of the pump.

(s) The brake apparatus according to one aspect of the invention may have a configuration in which the pump pressurization checking unit is configured to be operated before the fluid-leakage detecting unit is activated.

Since a pressurization system is first checked, the detection is improved in responsiveness.

(t) The brake apparatus according to one aspect of the invention may have a configuration including:

a first malfunction judgment unit configured to calculate a deviation between the target wheel-cylinder hydraulic pressure and a detection value of the first hydraulic-pressure sensor, and determine a first malfunction when there is a deviation equal to or larger than a predetermined deviation; and a second malfunction judgment unit configured to calculate a deviation between the target wheel-cylinder hydraulic pressure and a detection value of the second hydraulic-pressure sensor, and determine a second malfunction when there is a deviation equal to or larger than a predetermined deviation, in which the fluid-leakage detecting unit is configured to be operated when both the first and second malfunction judgment units determine malfunctions.

This improves responsiveness of the malfunction judgment.

(u) The brake apparatus may have a configuration including:

first and second fluid passages configured to fluidically communicate a hydraulic-pressure source with first and second wheel cylinders; and first and second control valves placed in the first and second passages and configured to control flows of the brake fluid from the hydraulic-pressure source to the first and second wheel cylinders, in which the first and second control valves are alternately switched between open and closed positions more than once, and a brake-fluid leakage in the first or second fluid passage is detected on the basis of magnitudes of hydraulic pressures of the first and second wheel cylinders during the open-close switching of the first and second control valves.

(v) A controller of a brake apparatus may have a configuration including first and second fluid passages configured to fluidically communicate the hydraulic-pressure source with first and second wheel cylinders; and first and second control valves placed in the first and second fluid passages and configured to control flows of a brake fluid from the hydraulic-pressure source to the first and second wheel cylinders, the controller in which first and second control valves are alternately switched between open and closed positions more than once, and a brake-fluid leakage in the first or second fluid passage is detected on the basis of magnitudes of hydraulic pressures of first and second wheel cylinders during the open-close switching of the first and second control valves.

The brake apparatus according to each of the embodiments described above is capable of identifying a fluid leak spot while generating a braking force.

Modes for carrying out the invention have been described above with reference to the embodiments. Specific configurations of the present invention, however, are not limited to the configurations shown in the embodiments. Design changes or the like which are made within the scope not deviating from the spirit of the invention are included in the invention.

The present application claims priority under Japanese Patent Application No. 2013-024138 filed on Feb. 12, 2013. The entire disclosure of Japanese Patent Application No. 2013-024138 filed on Feb. 12, 2013, including the description, claims, drawings and abstract, is incorporated herein by reference in its entirety.

The entire disclosure of Japanese Patent Application Publication No. 2000-168536, including the description, claims, drawings and abstract, is incorporated herein by reference in its entirety.

REFERENCE SIGNS LIST 1 brake apparatus
2 brake pedal
5 master cylinder
6 hydraulic pressure unit
7 pump (hydraulic-pressure source)
8a, 8d wheel cylinder (first wheel cylinder)
8b, 8c wheel cylinder (second wheel cylinder)
11a, 11d fluid passage (fluid passage of primary system)
11b, 11c fluid passage (fluid passage of secondary system)
11P fluid passage (first fluid passage)
11S fluid passage (second fluid passage)
13 discharge passage (communicating passage)
13P discharge passage (first fluid passage, communicating passage)
13S discharge passage (second fluid passage, communicating passage)
23P communicating valve (first control valve, first communicating valve)
23S communicating valve (second control valve, second communicating valve)

51P first fluid chamber (first chamber)
51S first fluid chamber (second chamber)
92P hydraulic-pressure sensor (first hydraulic-pressure sensor)
92S hydraulic-pressure sensor (second hydraulic-pressure sensor)
101 target wheel-cylinder hydraulic pressure controlling unit
102 fluid-leakage detecting unit
103 pump pressurization checking unit

The invention claimed is:

1. A brake apparatus comprising:
a hydraulic-pressure source configured to supply a plurality of wheel cylinders with a brake fluid pressure corresponding to a brake pedal operation by a driver;
a first fluid passage configured to fluidically communicate the hydraulic-pressure source with a first wheel cylinder that is at least one of the wheel cylinders;
a second fluid passage configured to fluidically communicate the hydraulic-pressure source with a second wheel cylinder that is another of the wheel cylinders;
a first control valve placed in the first fluid passage to be located between the first wheel cylinder and the hydraulic-pressure source;
a second control valve placed in the second fluid passage to be located between the second wheel cylinder and the hydraulic-pressure source;
a first hydraulic-pressure sensor placed in the first fluid passage and configured to detect a hydraulic pressure existing between the hydraulic-pressure source and the first wheel cylinder;
a second hydraulic-pressure sensor placed in the second fluid passage and configured to detect a hydraulic pressure existing between the hydraulic-pressure source and the second wheel cylinder;
a fluid-leakage detecting unit configured to supply a brake fluid to the first and second fluid passages through the hydraulic-pressure source, switch the first and second control valves alternately between open and closed positions more than once, and detect a brake-fluid leakage in the first or second fluid passage on the basis of magnitudes of detection values detected by the first and second hydraulic-pressure sensors during the open-close switching, and
a target wheel-cylinder hydraulic pressure controlling unit configured to calculate a target wheel-cylinder hydraulic pressure corresponding to the brake pedal operation by the driver, wherein:
the fluid-leakage detecting unit is configured to carry out fluid leakage detection processing when a deviation between the target wheel-cylinder hydraulic pressure calculated during the brake pedal operation by the driver and detection values of the first and second hydraulic-pressure sensors is larger than a predetermined deviation.

2. The brake apparatus of claim 1, wherein:
the control valve corresponding to the fluid passage in which fluid leakage is detected by the fluid-leakage detecting unit is driven in a closing direction, and another control valve is driven in an opening direction.

3. A brake apparatus, comprising:
a hydraulic-pressure source configured to supply a plurality of wheel cylinders with a brake fluid pressure corresponding to a brake pedal operation by a driver;
a first fluid passage configured to fluidically communicate the hydraulic-pressure source with a first wheel cylinder that is at least one of the wheel cylinders;
a second fluid passage configured to fluidically communicate the hydraulic-pressure source with a second wheel cylinder that is another of the wheel cylinders;
a first control valve placed in the first fluid passage to be located between the first wheel cylinder and the hydraulic-pressure source;
a second control valve placed in the second fluid passage to be located between the second wheel cylinder and the hydraulic-pressure source;
a first hydraulic-pressure sensor placed in the first fluid passage and configured to detect a hydraulic pressure existing between the hydraulic-pressure source and the first wheel cylinder;
a second hydraulic-pressure sensor placed in the second fluid passage and configured to detect a hydraulic pressure existing between the hydraulic-pressure source and the second wheel cylinder; and
a fluid-leakage detecting unit configured to supply a brake fluid to the first and second fluid passages through the hydraulic-pressure source, switch the first and second control valves alternately between open and closed positions more than once, and detect a brake-fluid leakage in the first or second fluid passage on the basis of magnitudes of detection values detected by the first and second hydraulic-pressure sensors during the open-close switching, wherein:
the fluid-leakage detecting unit is configured to switch the first and second control valves alternately between the open and closed positions with a predetermined period, and
a valve-opening duration of either one of the first and second control valves is increased along with increase of a hydraulic pressure detected by the first or second hydraulic-pressure sensor.

4. A brake apparatus comprising:
a fluid passage of a primary system configured to fluidically communicate with a plurality of wheel cylinders that can be pressurized with a master-cylinder hydraulic pressure generated by a first chamber of a master cylinder that generates a brake fluid pressure in response to a brake pedal operation by a driver;
a fluid passage of a secondary system configured to fluidically communicate with a plurality of wheel cylinders that can be pressurized with a master-cylinder hydraulic pressure generated by a second chamber of the master cylinder;
a communicating passage connecting the fluid passage of the primary system to the fluid passage of the secondary system;
a pump configured to discharge a brake fluid to the communicating passage;
first and second communicating valves placed in the communicating passage, the first communicating valve configured to suppress the brake fluid from flowing from the communicating passage to the fluid passage of the primary system, and the second communicating valve configured to suppress the brake fluid from flowing from the communicating passage to the fluid passage of the secondary system;
a first hydraulic-pressure sensor placed in the primary system;
a second hydraulic-pressure sensor placed in the secondary system; and
a fluid-leakage detecting unit configured to drive the pump, repeat alternate open-close switching of the first and second communicating valves more than once to pump the brake fluid into the systems, and detect a brake-fluid leakage in the systems on the basis of detection values of the first and second hydraulic-pressure sensors.

5. The brake apparatus of claim 4, comprising:
a target wheel-cylinder hydraulic pressure controlling unit configured to calculate a target wheel-cylinder hydraulic pressure corresponding to the brake pedal operation by the driver, wherein:
the fluid-leakage detecting unit is configured to carry out fluid leakage detection processing when a deviation between the target wheel-cylinder hydraulic pressure calculated during the brake pedal operation by the driver and the detection values of the first and second hydraulic-pressure sensors is larger than a predetermined deviation.

6. The brake apparatus of claim 4, wherein:
the control valve corresponding to the fluid passage in which a fluid leakage is detected by the fluid-leakage detecting unit is driven in a closing direction, and another control valve is driven in an opening direction.

7. The brake apparatus of claim 4, comprising:
a discharge-pressure sensor placed in the communicating passage; and
a pump pressurization checking unit configured to drive the pump, control the communicating valves in a closing direction, and check the pressurization of the pump on the basis of a detection value of the discharge-pressure sensor.

8. The brake apparatus of claim 7, comprising:
a return passage that is interposed between at least either one of the communicating valves and the pump, and configured to return the brake fluid discharged into the communicating passage to a suction side of the pump.

9. The brake apparatus of claim 7, wherein:
the pump pressurization checking unit is configured to be operated before the fluid-leakage detecting unit is activated.

10. The brake apparatus of claim 4, wherein:
the fluid-leakage detecting unit is configured to switch the first and second control valves alternately between open and closed positions with a predetermined period.

11. The brake apparatus of claim 10, wherein:
a valve-opening duration of either one of the first and second control valves is increased along with increase of a hydraulic pressure detected by the first or second hydraulic-pressure sensor.

12. The brake apparatus of claim 4, comprising:
a target wheel-cylinder hydraulic pressure controlling unit configured to calculate a target wheel-cylinder hydraulic pressure corresponding to the brake pedal operation by the driver;
a first malfunction judgment unit configured to calculate a deviation between the target wheel-cylinder hydraulic pressure and the detection value of the first hydraulic-pressure sensor, and determine a first malfunction when there is a deviation equal to or larger than a predetermined deviation; and
a second malfunction judgment unit configured to calculate a deviation between the target wheel-cylinder hydraulic pressure and the detection value of the second hydraulic-pressure sensor, and determine a second malfunction when there is a deviation equal to or larger than a predetermined deviation.

13. The brake apparatus of claim 12, wherein:
the fluid-leakage detecting unit is configured to be operated when both the first and second malfunction judgment units determine the malfunctions.

14. A brake apparatus comprising:
a fluid passage of a primary system configured to fluidically communicate with a plurality of wheel cylinders that can be pressurized with a master-cylinder hydraulic pressure generated by a first chamber of a master cylinder that generates a brake fluid pressure in response to a brake pedal operation by a driver;
a fluid passage of a secondary system configured to fluidically communicate with a plurality of wheel cylinders that can be pressurized with a master-cylinder hydraulic pressure generated by a second chamber of the master cylinder;
a communicating passage connecting the fluid passage of the primary system to the fluid passage of the secondary system;
a pump configured to discharge a brake fluid to the communicating passage;
first and second communicating valves placed in the communicating passage, the first communicating valve configured to suppress the brake fluid from flowing from the communicating passage to the fluid passage of the primary system, the second communicating valve configured to suppress the brake fluid from flowing from the communicating passage to the fluid passage of the secondary system;
a first hydraulic-pressure sensor placed in the primary system;
a second hydraulic-pressure sensor placed in the secondary system;
a target wheel-cylinder hydraulic pressure controlling unit configured to drive the pump to obtain a target wheel-cylinder hydraulic pressure calculated on the basis of the brake pedal operation by the driver; and
a fluid-leakage detecting unit configured to repeat alternate open-close switching of the first and second communicating valves more than once during control by the target wheel-cylinder hydraulic pressure controlling unit to pump the brake fluid into the systems, and detect a brake-fluid leakage in the systems on the basis of detection values of the first and second hydraulic-pressure sensors.

15. The brake apparatus of claim 14, comprising:
a first malfunction judgment unit configured to calculate a deviation between the target wheel-cylinder hydraulic pressure and the detection value of the first hydraulic-pressure sensor, and determine a first malfunction when there is a deviation equal to or larger than a predetermined deviation; and
a second malfunction judgment unit configured to calculate a deviation between the target wheel-cylinder hydraulic pressure and the detection value of the second hydraulic-pressure sensor, and determine a second malfunction when there is a deviation equal to or larger than a predetermined deviation, wherein:
the fluid-leakage detecting unit is configured to be operated when both the first and second malfunction judgment units determine the malfunctions.

16. The brake apparatus of claim 15, comprising:
a discharge-pressure sensor placed in the communicating passage; and
a pump pressurization checking unit configured to drive the pump, control the communicating valves in a closing direction, and check pressurization of the pump on the basis of a detection value of the discharge-pressure sensor.

17. The brake apparatus of claim 16, comprising:
a return passage that is interposed between at least either one of the communicating valves and the pump, and configured to return the brake fluid discharged into the communicating passage to a suction side of the pump.

18. The brake apparatus of claim 16, wherein:
the pump pressurization checking unit is configured to be operated before the fluid-leakage detecting unit is activated.

* * * * *